US007155715B1

(12) United States Patent
Cui et al.

(10) Patent No.: US 7,155,715 B1
(45) Date of Patent: Dec. 26, 2006

(54) DISTRIBUTED SOFTWARE SYSTEM VISUALIZATION

(75) Inventors: Zhan Cui, Colchester (GB); Brian R Odgers, Craigavon (GB); Michael Schroeder, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/914,602

(22) PCT Filed: Mar. 17, 2000

(86) PCT No.: PCT/GB00/01026

§ 371 (c)(1),
(2), (4) Date: Aug. 30, 2001

(87) PCT Pub. No.: WO00/58880

PCT Pub. Date: Oct. 5, 2000

(30) Foreign Application Priority Data

Mar. 31, 1999 (GB) ................................. 9907492.4
Jul. 2, 1999 (GB) ................................ 99305279.4

(51) Int. Cl.
*G06F 7/00* (2006.01)
*G06F 17/30* (2006.01)
*G06F 9/445* (2006.01)

(52) U.S. Cl. ...................... 717/177; 345/473; 376/245; 376/260; 707/2; 707/3; 707/4; 709/224; 709/229

(58) Field of Classification Search ................ 709/101, 709/224, 229; 707/2–4; 717/177; 345/156; 376/245, 260
See application file for complete search history.

(56) References Cited

U.S. PATENT DOCUMENTS 5,636,376 A    6/1997 Chang
(Continued)

FOREIGN PATENT DOCUMENTS

WO      WO 99/05597        2/1999

OTHER PUBLICATIONS

O'Brien et al, "Using Software Agents for Business Process Management", British Telecommunications Engineering, GB, British Telecommunications Engineering, London, vol. 15, No. 4, pp. 326-333, XP000681457.

(Continued)

*Primary Examiner*—Anthony Knight
*Assistant Examiner*—Sunray Chang
(74) *Attorney, Agent, or Firm*—Nixon & Vanderhye P.C.

(57) ABSTRACT

A data management system stores and visualizes data generated during process management. The data management system provides different data management services and definitions of these are stored in a database. Management of data in this database is carried out by a collection of software agents, one of which, the management information agent, can access, update and download data in or from the database. Stored separately are graphical user interfaces which are downloaded to a user in accordance with the relevant service definition stored in the database when the user requests a particular data access service.

8 Claims, 18 Drawing Sheets

U.S. PATENT DOCUMENTS

| | | | |
|---|---|---|---|
| 5,893,905 | A | 4/1999 | Main et al. |
| 6,240,450 | B1* | 5/2001 | Sharples et al. ............ 709/224 |
| 6,327,586 | B1* | 12/2001 | Kisiel ............................ 707/2 |
| 6,330,588 | B1 | 12/2001 | Freeman |
| 6,404,437 | B1* | 6/2002 | Russell et al. ............. 345/473 |
| 6,407,996 | B1 | 6/2002 | Witchalls |
| 6,470,375 | B1 | 10/2002 | Whitner et al. |
| 6,714,976 | B1 | 3/2004 | Wilson et al. |
| 2002/0065856 | A1* | 5/2002 | Kisiel ......................... 707/530 |
| 2002/0188618 | A1* | 12/2002 | Ma et al. ................... 707/102 |
| 2004/0148610 | A1 | 7/2004 | Tsun et al. |

OTHER PUBLICATIONS

O'Brien et al, "Agents of Change in Business Process Management", BT Technology Journal, GB, BT Laboratories, vol. 14, No. 4, pp. 133-140, XP000635341, ISSN: 1358-3948.

Pastor et al, "An Architecture for Intelligent Resource Agents", Proceedings of the Second IFCIS International Conference on Cooperative Information Systems, COOPIS '97: (CAT. No. 97TB100143), Proceedings of COOPIS 97: 2$^{nd}$ IFCIS Conference on Cooperative Information Systems, Kiawah Island, SC, USA, Jun. 24-27, 1997, pp. 151-159, XP002129637.

Olsen et al, "Collaborative Engineering Based on Knowledge Sharing Agreements", Concurrent Engineering: Research and Applications, Jun. 1995, Technomic Publishing, USA, vol. 3, No. 2, pp. 145-159, XP000872248, ISSN: 1063-293X.

Marazakis et al., "Aurora: An Architecture for Dynamic and Adaptive Work Sessions in Open Environments," Proceedings of the International Conference on Database and Expert System Applications (DEXA '98), Springer-Verlag LNCS Series (1998), http//citeseer.ist.psu.edu/marazakis97aurora.html.

Labrou et al., "Agent Communication Languages: The Current Landscape," IEEE Intelligent Systems (Mar.-Apr. 1999), vol. 14, No. 2, pp. 45-52, XP002129638.

Geiger et al., "Visual Modeling and 3D-Representation With A Computer Visual Programming Language—A Case Study in Manufacturing," Proceedings, IEEE Symposium on Visual Languages (Cat. No. 96TB1000066), Boulder, CO, USA (Sep. 3-6, 1996), pp. 304-305, XP002129639.

Frölich et al., "Demonstration of the Interactive Graph Visualization System *daVinci*," Proceedings of DIMACS International Workshop, GD'94, Princeton, NJ (Oct. 10-12, 1994), pp. 266-269, XP002129640.

Cleaveland et al., "The Concurrency Workbench: A Semantics-based Tool for the Verification of Concurrent Systems." ACM Transactions on Programming Languages and Systems (Jan. 1993), vol. 15, No. 1, pp. 36-72, XP000872148.

Marazakis et al., "Management of Work Sessions in Dynamic Open Environments," Proceedings Ninth International Workshop on Database and Expert Systems Applications (Cat. No. 98EX130), Vienna, Austria (Aug. 26-28, 1998), pp. 725-730, XP002137443.

Jennings et al., "Using Intelligent Agents to Manage Business Processes," PAAM 96, Proceedings of the First International Conference on the Practical Application of Intelligent Agents and Multi-Agent Technology, pp. 345-360, XP000872091.

Gervais et al., "Design of Telecommunication Services Based on Software Agent Technology and Formal Methods," IEEE (1997).

Canadian Office Action dated Oct. 18, 2005.

\* cited by examiner

FIPA protocol handling

Relationship between agent messages and events

Contract compliance view

Task utilisation chart

Task commitment chart

Fig. 21. Task Status Chart

Business Process Flowchart

SLA execution graph

DISTRIBUTED SOFTWARE SYSTEM VISUALIZATION

BACKGROUND OF THE INVENTION

1. Field of the Invention

The present invention relates to distributed software system visualisation and analysis and finds particular application in performance visualisation and analysis.

2. Related Art

Performance visualisation and analysis is used for instance in process management in order to improve management systems.

Software agents are known for use in process management and embodiments of the present invention are particularly suited to the use of software agents.

A software agent can be considered as software, supported in use by hardware, which is capable of performing tasks on behalf of an entity. An agent therefore usually includes data specific to the entity concerned, for instance data representing requirements or capabilities, and means for applying the data in decision-making processes usually involving another entity or system. Such means might for instance therefore include a negotiation process and communication means such as a message handler.

Software agents at least theoretically can be used in the creation of a flexible and responsive virtual enterprise for process management. Agents in a virtual enterprise may be autonomous, collaborative and adaptive. That is, these enterprise agents are able to take actions without explicit instructions from their users (autonomous), are able to co-operate with other agents when problems are too large and complex for one to solve alone (collaborative), and are able to adapt their behaviours to their users and/or environments (adaptive or learning).

Each agent in an enterprise requires resources to carry out tasks and it manages its own resources. Each agent is adapted to carry out particular tasks and it can act on its own according to its current resources and objectives. When an agent requires a service which it cannot provide on its own, for instance running a process, it communicates with agents which can provide such a service, and negotiates terms and conditions for providing such a service. This involves contracts often known as Service Level Agreements (SLAs) between agents. These effectively set out rules of behaviour for agents in collaboration. Overall tasks are then realised by a plurality of participating agents operating in accordance with their SLAs.

Relevant systems of this type are described in "Agents of Change in Business Process Management", by O'Brien P D and Wiegand M E, published in BT Technical Journal, Intelligent Systems Special Issue, Vol. 14, No. 4, October 1996; and in "Using Software Agents for Business Process Management", by O'Brien P D, Wiegand M E, Odgers B, Voudouris C and Judge D, published in British Telecommunications Engineering, January 1997.

There are many advantages of using collaborative agents. Distributed autonomous agents are used in process management, including decentralised business management. Processes modelled by agents can be dynamically defined by the interaction of agents and their contract patterns. Thus, new services can be constructed quickly in responding to market demands. Exceptions can be dealt with locally by agents so that their impact can potentially be minimised. For example, an agent can choose another service provider (i.e. agent) if a previously selected service provider fails to deliver a service. Moreover, service providers from outside the immediate system may be used. Because agents can be programmed to have learning capabilities, potential problems can be engineered out and/or contingency actions can be planned beforehand.

Agents can negotiate contracts for services based on local assessment of cost vs. benefit. Agents in a virtual enterprise work together to perform mutually-beneficial but complex tasks. In negotiating contracts, an agent performs reasoning over its resources, objectives and its environment. Agents can adapt according to their environment. The performance or behaviour of the system as a whole results from the behaviours of the individual agents and the pattern of contracts in place at a current time. A change in conditions, such as the introduction of new agents and/or services, will result in changes in costs and benefits as perceived by the agents, which will in turn result in changes in the network of contracts and how the whole system behaves.

Collaborative software agents have been used to develop a range of applications. Although tools are available to assist in building agent-based systems, not a great deal of work has been done on how to visualise and/or tune agents in an independent or pre-existing system to optimise performance.

BRIEF SUMMARY OF EXEMPLARY EMBODIMENTS

According to a first aspect of the present invention, there is provided a data management system for use in storing and visualising data generated during use of a process management system in managing processes, said data management system having:

i) a request input for receiving a data management service request from the process management system;
ii) a data input for receiving data inputs from the process management system;
iii) a service definitions store for storing a set of service definitions each comprising one or more service requirements in relation to respective ones of a set of service identifiers, including identification of data inputs required for provision of data management services in respect of each service identifier;
iv) request processing means for accessing a service identifier in a received service request;
v) service identifier processing means for selecting a service definition from the service definition store in accordance with an accessed service identifier; and
vi) a data input store for storing data inputs from the process management system required for provision of a data management service associated with an accessed service identifier.

Generally, each data management service associated with a service definition will also provide visualisation of at least one aspect of the process management system. The data management system will therefore usually further comprise a library for visualisation tools such as graphical user interface tools. In a preferred embodiment, the data management system further comprises an input for loading visualisation tools to the library. This allows data management services to be added to the capabilities of the data management system through its lifetime.

Particularly advantageously, the data management system associates data inputs with the process management system which has generated the data and comprises means to review the contents of the data input store for entries in respect of that process management system, on receipt of a service request from that process management system. This enables a process management system to make a retrospective service request, for instance for a visualisation service, in respect of a process already carried out.

Further, if the data management system also has a visualisation tool library, it becomes possible for the process management system to store data inputs by means of a first service request, for a user to load a visualisation tool such as a graphical user interface to the library, and for the process management system then to use the stored data inputs to support the new visualisation tool.

As an alternative to visualisation, the data management system may provide data analysis. Preferably therefore, the data management system comprises data analysis means in place of or as well as the library for visualisation tools.

Importantly, data analysis in embodiments of the present invention can provide analysis at the level of inter-agent agreements as well as or in place of analysis at the resource level.

Embodiments of the present invention can thus provide the user with powerful tools for use in both visualisation and analysis, leading potentially to establishing new practices and processes, across a multi-platform, multi-functional environment, and this can be done where the environment has been developed independently of the invention, either before or after an embodiment of the invention itself is available. For instance, embodiments of the present invention can provide information on the execution of processes, emergent behaviours of adaptive agents, and resource usage across a company's systems. As mentioned above, embodiments of the present invention can be brought into use with a system to provide visualisation and analysis services retrospectively in respect of use of the system, and can be adapted very easily to meet new visualisation and analysis requirements. This is very advantageous for agent-based systems because these systems are dynamic and their visualisation and analysis requirements are difficult to pre-specify.

In embodiments of the present invention, an agent management system ("AMS") has been developed to provide services to management systems. In particular, the AMS is well-adapted to provide services to agent-based process management systems ("APMSs") and the following description is primarily directed to use of an AMS with one or more APMSs.

The AMS uses an agent-based infrastructure which includes three main service agents:

1) a Management Information Agent (MIA) that provides information services to both agents managed by the AMS (APMS agents) and employed by the AMS (AMS agents). The MIA uses databases to record information from APMS agents. Information retrieval is through an Event Query Language (EQL) which is based on the standard database query language SQL. All requests to an MIA from APMS agents have to be through FIPA ACL (see below) messages;

2) a Visualisation Agent (VA) that provides information visualisation services to APMS agent systems. It has a library of graphical user interfaces (GUIs) which includes a collection of visualisation software packages. GUI presentation screens are constructed dynamically according to service requests and tools currently available in its GUI library. Information visualisation can be done on-line (real time monitoring of in-service agents) as well as off-line (playback). In case of playback, relevant data is retrieved from an MIA database; and 3) an Engineering Agent (EA) that provides tools to re-engineer, to improve (or fine-tune) and/or to debug in-service agents. This includes decision support tools to analyse agent performance; tools to check contract compliance; tools to detect potential 'circularities' in recursively defined services; and tools to assist in realising management policies to be enacted by agents. The management policies include negotiation strategies, exception handling policies, resource management techniques and security policies.

FIPA ACL messages are mentioned above. FIPA is the Foundation for Intelligent Physical Agents, a non-profit organisation for promoting development of specifications of generic agent technologies that maximise interoperability within and across agent-based systems. It has a home page at http://drogo.cselt.stet.it/fipa/. ACL stands for "Agent Communication Language", a FIPA standard.

The visualisation system for the AMS is built to be as generic as possible. It interacts with APMS agents by exchanging standard FIPA ACL messages. With appropriate wrappers, the AMS can be used to provide visualisation and monitoring services to other distributed systems as well. (A wrapper in this context is a Java program for transforming data to a format for use by a particular tool. It will comprise the name of the tool and a list of the parameters for that tool, usually the data required.)

An important aspect of the visualisation system is that APMS agents can load data to an MIA database and, subsequently, can load and run a GUI at the AMS for visualising that data, for instance within the APMS, or can load and run a data analyser.

An important aspect of the engineering agent is its ability to analyse task breakdown offline. That is, it doesn't only monitor task performance at runtime, which is effectively a test at the resource level, but analyses task allocation in the context of the contract. This provides analysis of the business process as well as monitoring at the resource level.

BRIEF DESCRIPTION OF THE DRAWINGS

An agent management system, the AMS, will now be described, by way of example only, as an embodiment of the present invention, with reference to the accompanying drawings in which.

DETAILED DESCRIPTION OF EXEMPLARY EMBODIMENTS

Overview of the System

Figure 1:
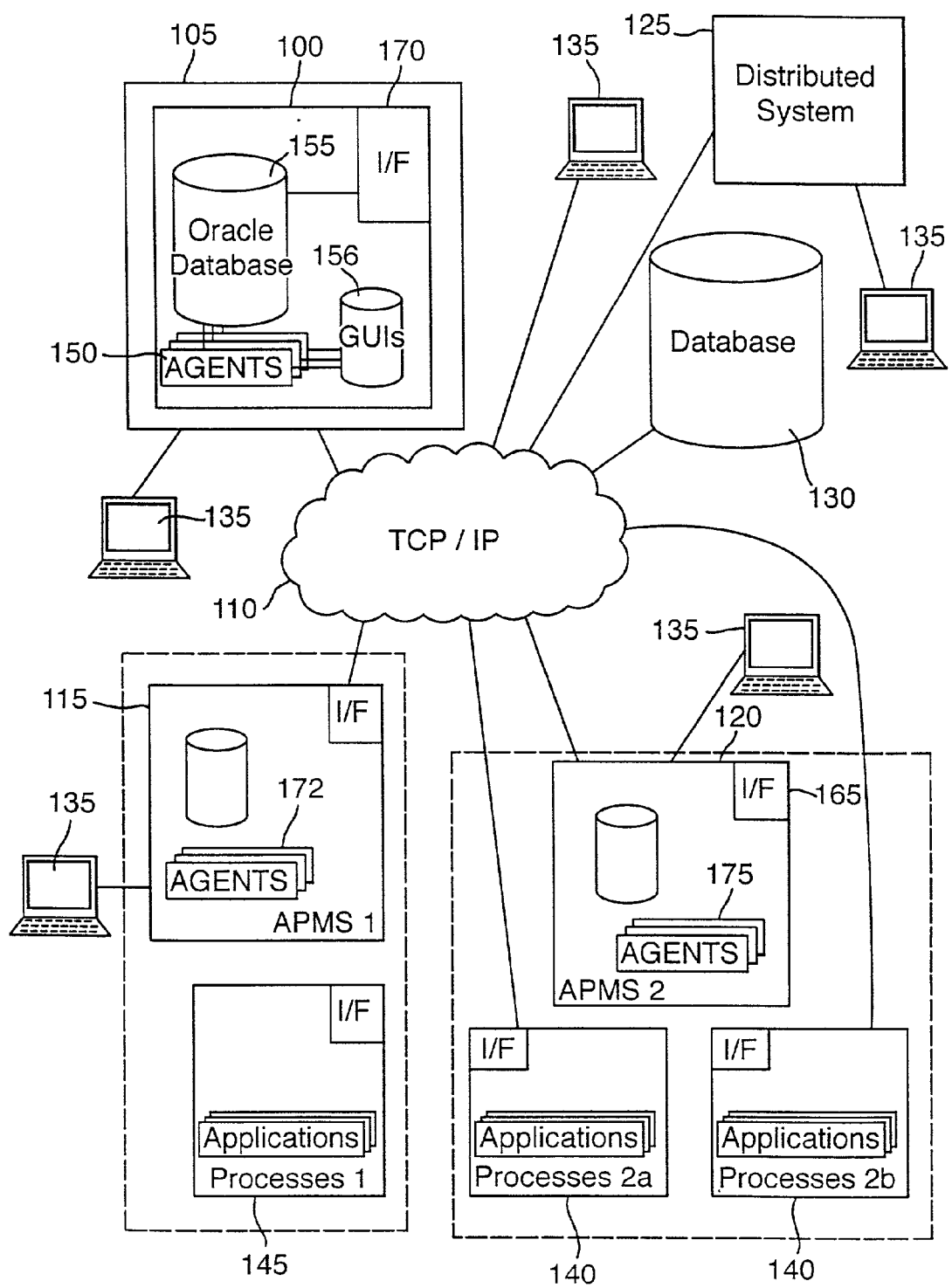
FIG. 1 shows an AMS in the context of APMSs and processes it supports and the communications and processing infrastructure.

Referring to FIG. 1, the AMS 100 comprises software processes or agents 150 and one or more databases 155 installed on a server 105. The server 105 is connected to a network 110 which can carry TCP/IP messages. Also connected to the network 110 are:
- one or more APMSs 115, 120 (two shown)
- one or more sets of processes 140, 145 (two shown) which are managed by respective APMSs
- a distributed system 125
- a database 130
- a plurality of user interfaces 135 each with a display screen
- Only one user interface 135 is shown connected directly to the network 110 but additional user interfaces 135 may be connected indirectly and such user interfaces are shown for example connected via the APMSs 115, 120, the AMS 100 and the distributed system 125.

The AMS 100 uses agents as its basic building blocks. It interacts with other systems by exchanging messages. It provides to the APMSs 115, 120 and to the distributed system 125 the following main functions:
- Receiving requests and making visualisation or engineering service level agreements, particularly with APMS agents, through negotiation.
- Requesting data from APMS agents or the distributed system.
- Providing permanent storage for APMS agents or the distributed system to load data to.
- Storing historical data.
- Visualising data either on-line or off-line (playback mode).
- Performing data analysis.
- Verifying SLAs.
- Generating solutions to improve agent performance.

The basis for interaction between the APMSs 115, 120 and the AMS 100, and the process for initiation, is as follows.

An important aspect of the APMSs 115, 120 and use of the AMS 100 is the service level agreement (SLA) between agents. A process managed by an APMS 115, 120 is usually too great or complex to be carried out by the resources one agent has available. The agents 172, 175 of the APMSs therefore manage processes amongst themselves (or at least can be represented as doing so) by breaking the processes down into sub-processes and tasks and negotiating SLAs between themselves for use of the resources of multiple agents in support of the overall process. When the APMS 115, 120 requires the AMS 100 to supply a service to it, for instance visualisation or data analysis, the APMS as a whole will again do so by negotiating an SLA, this time with the AMS 100.

An agreed interagent SLA in this environment usually identifies the agents, gives the SLA an identifier, identifies the service to be provided by name, and records the time of start of provision of the service. If there are multiple services and agents involved, this can conveniently be stored as an "Agent-SLA" table. The components of the service itself, for instance in terms of tasks to be carried out and conditions to be met such as supply of supporting data, can be stored elsewhere against the service name. For instance service definitions can be stored in an ontology accessible to the agents which require the definition.

If an APMS 115, 120 requires an AMS 100 to provide a service, it sends a service request message to the AMS 100. In order to support the establishment of the service, the message gives the AMS 100 information about the APMS and the resources and services it manages. The message lists the agents of the APMS 115, 120 and the services that it manages in terms of identity and description. The description goes down to the task level and includes setting out the order in which the tasks must happen. The AMS 100 will store this information, for instance against an entry in an "Agent-SLA" table of its own. Once the AMS 100 and APMS 115, 120 have an SLA in place, it is still necessary for the APMS to supply its own interagent SLA details to the AMS. This occurs on start up of the APMS in managing the overall process it is installed to manage. It is only at that point that the agents of the APMS negotiate and agree their own SLAs. The APMS will then supply an "Agent-SLA" table for its own agents to the AMS 100 which is updated as the overall process runs.

Once the process managed by the APMS is running, the AMS 100 requests data from the APMS in accordance with the definition of the service agreed and stores it in its database 155. As long as the data was supplied and was not corrupted or refused for security reasons for instance, the AMS 100 can then use the data in visualisation and analysis at any time on request of the APMS 115, 120.

To visualise the data, the AMS 100 selects a GUI from its GUI library 156. Importantly, if a suitable or requested GUI is not in the library 156 when a visualisation service is requested, it is possible to load a suitable GUI at a later time and use the new GUI to analyse or visualise data previously loaded to the database 155.

A service as described above can also be provided by the AMS 100 in response to a user request. There does not have to be an existing SLA between the AMS 100 and the APMS 115, 120.

All agents in the AMS 100 are FIPA compliant. They interact with each other by exchanging FIPA ACL messages. The contents of the messages of the AMS agents 150 are represented by an Event Query Language (EQL). EQL is based on SQL. Details of EQL are described further below. The interactions between AMS agents and APMS agents are also done by exchanging FIPA messages. The contents of those messages are represented by using the Process Interchange Format (PIF) language (a known language which is published on the Internet for example at http://ccs.mit.edu/pif/) and a common shared ontology (shared vocabulary and their semantics) which is also described in later sections.

The AMS 100 offers services to agents of other systems, as long as those agents are configured to communicate correctly, for instance via interface agents 165, 170. When an agent requests a service from the AMS system, it sends FIPA ACL request messages to the AMS system. Upon receiving a request, for instance from APMS agents, the AMS 100 will decide whether it can provide the requested service. This will be decided on its current resources. If a service can be provided, the AMS will send a positive response with any preconditions. If this is accepted by the requesting agent, an SLA is made. The preconditions specify what the requesting agent has to provide to the AMS 100. For example, if an agent would like the AMS 100 to display the states of an activity over a period of time, it has to give the activity states to the AMS 100.

Each APMS 115, 120 provides a management system for a set of processes. For instance, a first APMS 115 together with its processes 145 might provide a workflow-based work distribution system as described in "Agents of Change in Business Process Management" (referenced above). A second APMS 120 together with its processes 140, which may be installed on two or more separate platforms, might provide a business process management system as described in "Using Software Agents for Business Process Management" (referenced above). Importantly, each APMS 115, 120 and the AMS 100 is provided with means to communicate using FIPA ACL messages via an interface agent 165, 170.

The distributed system 125 is similar to an APMS 115, 120 but is not necessarily agent-based. It also runs and manages processes and is equipped to communicate using FIPA ACL messages.

The database 130 represents data accessible via the network 110 and may in practice comprise a plurality of separate databases, accessible by means of one or several database query languages. It carries data to support the processes managed by the APMSs 115, 140.

User interfaces 135 are provided. These may be to the AMS, either or both of the APMSs, and via the network 110 to any of these or to the distributed system 125. Importantly, visualisation and engineering services provided by the AMS 100 can be run from any one of these user interfaces 135. Alternatively, other agents or processes, for instance within an APMS, might request a service from the AMS 100.

2. The AMS 100

Figure 2:
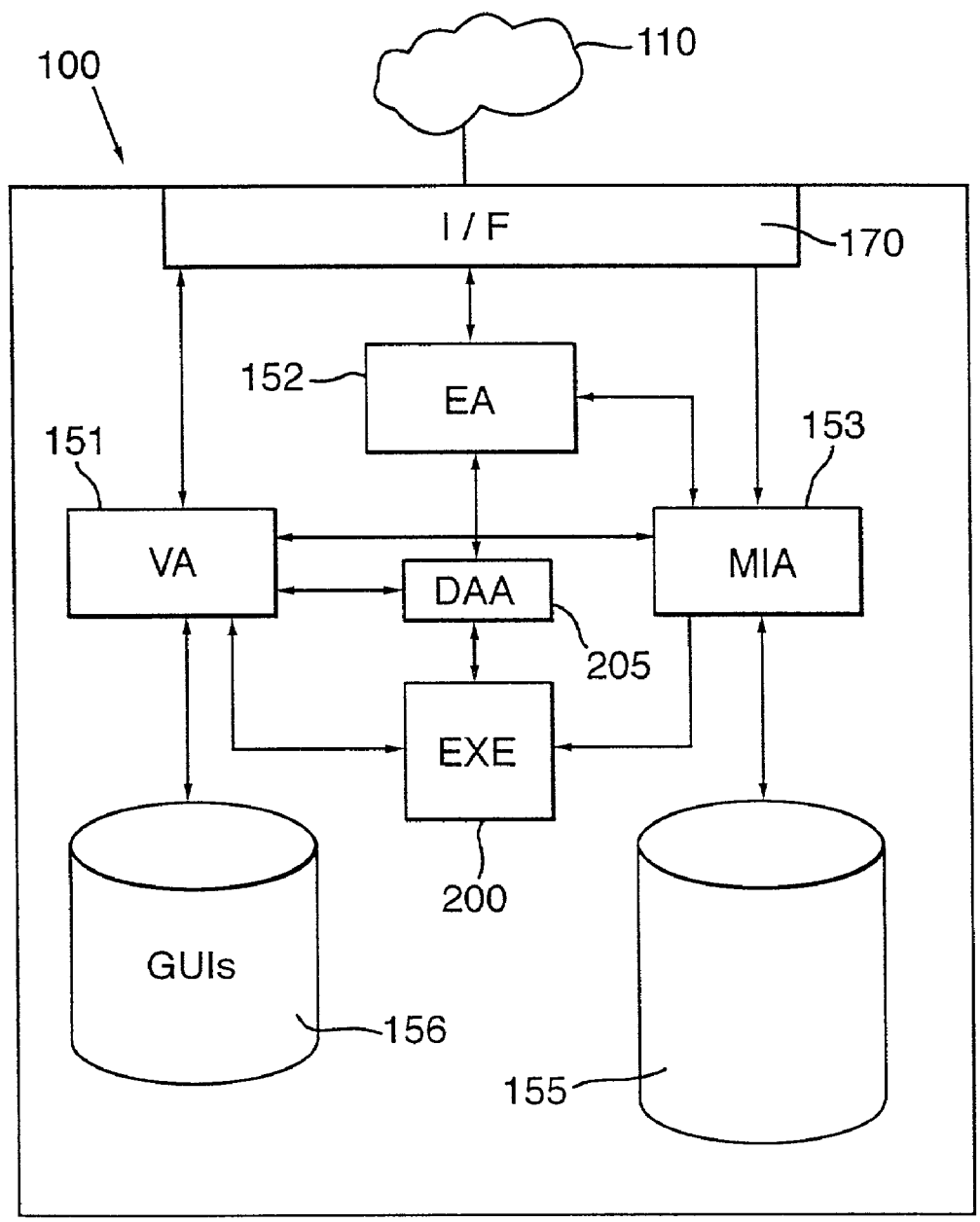
FIG. 2 shows the AMS of FIG. 1 in more detail.

Referring to FIG. 2, as mentioned above the AMS 100 comprises three main service agents 150, the visualisation agent (VA) 151, the management information agent (MIA) 153 and the engineering agent (EA) 152. The AMS 100 uses the VA 151 to provide visualisation services to an agent-based system by offering a selection of views of that system to the user. It uses the MIA 153 to provide information services such as long term data storage and access. It uses the EA 152 to provide performance-related services such as analysis and diagnosis of agent performance.

The AMS 100 communicates via the network 110 through an interface 170 and data incoming from APMS agents 172, 175 is stored in the database 155 by the MIA 153. This stored data can only be accessed via the MIA 153. The VA 151 has a GUI library 156 available to it.

In addition, the AMS 100 comprises an EXE 200 and a data analyser 205. The EXE 200 comprises known functionality, used by the VA 151, to control run-time environments such as maintaining currently active presentation screens and which data is related to which presentation screens. The data analyser 205 may be any suitable data analysis tool to support the engineering agent 152.

2.1 VA Functions

The VA (Visualisation agent) 151 is responsible for providing visualisation services. For instance, it can generate a set of presentation screens such as bar charts, pie charts and linked graphs. The VA 151 manages the GUI library 156 which holds a collection of data visualisation packages. Any visualisation request, by a user or by an APMS 115, 120 for instance, will trigger the VA 151 to construct presentation screens by using tools in its GUI library 156. The visualisation services provided by the VA 151 can be on-line (real time) as well as off-line (playback). Data required for visualisation services are pushed by the MIA 153, i.e., the MIA 153 sends data to the VA 151. In case of playback, the MIA retrieves the data from its database and sends it to the VA 151 according to an agreed rate. In case of real time visualisation, the MIA 153 first transforms the raw data from the APMS agents 172, 175 into a required form, sends it to the VA 151, and only then stores the data in its database 155.

Key to the visualisation aspects of the AMS 100 is the use of the GUI library 156 to hold a collection of presentation tools and/or software packages. The GUI library is managed by the visualisation agent 151 of the AMS. Upon receiving a new visualisation request, the visualisation agent 151 will decide whether the service can be provided by reviewing its current commitments and what presentation screens can be constructed from its GUI library. In addition, the MIA 153 is consulted as to whether the information can be transformed to a particular representation which a tool requires. If a service can be provided, the visualisation agent will compose the requested visualisation screens.

The composition of visualisation screens available in response to service requests offers an unlimited number of information views. Users are no longer limited to choose among a fixed number of presentation screens because it is a relatively simple matter to add tools to the GUI library 156. Indeed, the construction of presentation screens from the GUI library according to service requests gives the AMS 100 the capability to offer services which may not have been even envisaged by the system designers. Data from an APMS 115, 120 can be stored at runtime and then potentially visualised at some later date, using a later-developed GUI. It is relatively easy to incorporate new presentation tools into the AMS 100. All that is required is to wrap the tools appropriately ("wrapping" is a known software engineering technique for creating compatible interfaces between a piece of software and an environment for which it was not necessarily built) and load them to the GUI library 156.

2.2 EA Functions

The engineering agent 152 of AMS provides data analysis and verification services to APMS agent systems. The EA (Engineering agent) 152 is responsible for fine-tuning APMS agents 172, 175 by diagnosing problem causes, checking contract compliance and making recommendations according to its observation of their performance. It interacts with the MIA 153 to obtain historical data from the database 155, with a data analyser 205 to analyse the data and with the VA 151 to display results. Whenever appropriate, the engineering agent 152 also makes recommendations to APMS agent systems 115, 120 on how to tune its agents. It can be used to track down causes for a problem and compare the agreed SLAs with the actual services carried out.

Again, known diagnostic systems build these functions into actual application systems. AMS diagnostic functions are offered as services which can be requested by other agent systems.

2.3 MIA Functions

The MIA 153 has two aspects. It provides information services to APMSs 115, 120 and it provides data services for the VA 151 and the EA 152. To support the data services to the VA 151 and the EA 152, it uses at least one database 155

(an Oracle™ database) to store agent activities and their states. This provides data for the visualisation agent 151 to play back any episode of APMS agent activities and for the engineering agent 152 to carry out data analysis. To support the information services to agents or users outside the AMS 100, the MIA 153 can store data permanently on request. Thus, APMS agents can request the AMS 100 to provide permanent data storage, and information about other APMS agents and/or system wide information if security requirements are satisfied.

The MIA 153 operates to the pre-defined common shared ontology and EQL queries. Any agent can request MIA services which are defined in the pre-defined common shared ontology. Some services to VA and EA are pre-defined so that no negotiation is required for VA and EA to use these services.

The question of shared ontologies is a known one and relevant publications are "A Translation Approach to Portable Ontology Specifications" by Gruber TR, published in Knowledge Acquisition, 5(2), 1993, and "Collaborative Engineering based on Knowledge Sharing Agreements" by Olsen G R, Cutkosky M, Tenenbaum J M and Gruber T R, published in the Proceedings of the 1994 ASME Database Symposium, 1994.

The MIA 153 can be viewed as providing two aspects of functionality and is in fact shown in that manner in FIG. 2. It provides a negotiation interface function 170 to the AMS 100 as a whole. It also manages all access to the database 155. If a request is received from an APMS 115, 120 to store data, it is the MIA 153 which will receive the request and negotiate an SLA between the AMS 100 and the requesting agent. Subsequently all data under this agreement will be loaded to the database 155 via the MIA 153. If a request is later received to retrieve previously stored data, it is the MIA 153 which will review the request and, if the request is legitimate, retrieve the data from the database 155 and send it to the requesting agent. If an agent requests data to which it is not entitled to have access, the MIA 153 will detect that and respond accordingly.

The MIA 153 stores data from APMS agents either in its original form or in a changed form. If a data storage service is requested which is not related to the VA and/or the EA, data is stored in its original form. Otherwise, data is changed into a predefined format before being stored in the database. This includes data for visualisation and/or engineering services. Data for run-time visualisation services is also stored in the database in a changed format unless the requesting agent instructs otherwise.

If a request is to analyse and to diagnose agent performance, the MIA 153 of the AMS 100 will similarly make an SLA with the requesting agent according to the capability of the EA. The MIA 153 will load all data to be stored under this agreement in its database 155. When all the required data has been received, the EA 152 will retrieve it from the database 155 by means of the MIA 153, carry out the agreed service and then either display the results in a GUI interface or forward them to the requesting agent as appropriate.

In the embodiments described below, the server 105 supports a UNIX environment and the AMS agents 150 are implemented in JAVA (see the Javasoft home page at http://java.sun.com/), and OrbixWeb from IONA Inc (see the Orbix/OrbixWeb home page at http://www/orbix.com/). They exchange FIPA ACL messages with APMS agents through CORBA IDL interfaces (see the CORBA home page at http://www.omg.org/). Thus the AMS 100 can run on many different computing platforms and can be remotely contacted by APMS agents 170, 175.

The use of agents enables the system to scale up. The system can be easily upgraded, and new services can be easily constructed. AMS is implemented based on the platform independent CORBA standard so that it can be contacted by a large number of systems.

The database 155 is an Oracle database, accessible using Pro*C and C++ languages.

3. Visualisation and Engineering Requirements in the AMS 100

The AMS 100 is principally designed to manage agent-based systems. The dynamic, autonomous and adaptive nature of agent-based systems requires a flexible agent management system. The AMS 100 can provide information about both what has happened and is happening within an agent system, particularly agent interactions, their resource usage and their underlying business processes. It can also provide decision support tools to analyse agent performance and to re-engineer in-service agents to optimise their performance.

3.1 Visualisation Requirements for the AMS 100

Agent system visualisation in the AMS 100 has three perspectives:

Agency view—views of agent interactions and their relationships;

Agent view—states of an agent. This includes tasks and resources controlled by the agent; and Domain view—views of the business processes enacted by agents.

These three views are inter-related. It should be possible to access any view from any other views. Preferably, whenever appropriate and possible, animation and 3D display should be employed.

Referring again to FIG. 1, where the AMS 100 is managing an APMS 115, 120, the agency view is that of interactions between the agents 172, 175 within a single APMS. The agent view is of a single one of the agents 172, 175 in an APMS 115, 120 and the domain view is a view of the processes 140, 145 managed by an APMS.

3.1.1 Agency View

Agency view provides users with various views of the interactions between agents. This includes how agents are interconnected, their hierarchies, and communication patterns among them. The interactions between agents should be marked by message types and appropriate links. Agents should be represented as appropriate icons to reflect their types and their task states. It should be easy to see through its state representations whether an agent is idle, active, overloaded, failed, etc.

As agent systems may employ a large number of agents, the system should be able to show users only those agents they are interested in. Through these views, users should be able to view only those interactions concerning a particular type of message. Important messages should be indicated as such, and the most recently sent messages should be available for user inspection.

The user should have access to the contents of any message passed between some specified pair of agents by specifying which messages he or she is interested in. The messages should be displayed or replayed in human-readable form.

Users should be able to visualise these in real-time as well as to play back any episode of activities whenever required. The playback should be able to play in slow motion and/or pause modes.

3.1.2 Agent View

Agent view is used to show states of any given agent. Agent states should include at least the following:

- Execution states of tasks;
- Resource usage;
- SLA details;
- Negotiation strategies;
- Agents currently in contact.

This should be available at several levels of details, ranging from which rule the agent is currently executing to how active the agent is. Both a list of the most recently accomplished tasks, and the tasks about to be attempted, should be available to the user. It should be possible to show how states were arrived at and why decisions were made.

There should be facilities for the user to probe each message and/or decision sent or made by an agent to several levels of detail.

3.1.3 Domain View

Domain view is used to display any information about the underlying business processes managed and enacted by agent systems. For instance, in the domain view, it is possible to display which of the tasks and/or sub-business processes which together provide a complete business process or task is controlled by which agent. It is also possible in the domain view to animate the execution of business processes, showing which tasks have been executed, which tasks are currently executing and which tasks are going to be executed. The user should be able to obtain details about which agents are responsible for which tasks. The domain view therefore includes:

- views of each specific instance of a business process, sub-process or task, identifying the exact status of that particular process invocation
- views of the percentage utilisation of a specified resource
- views of the utilisation trend of resources for a specified service
- views of the overall aggregate utilisation of specified resources
- views of contract compliance
- views of detailed contract compliance For instance, a Contract Compliance View is used to display an instantaneous view of a number of agent agreements. Each task type is represented by a set of bar charts which present different aspects of the business processes with respect to the agents' contracts. A Detailed Contract Compliance View is used to visualise agent agreements and an actual flow of data over a period of time.

Figure 3:
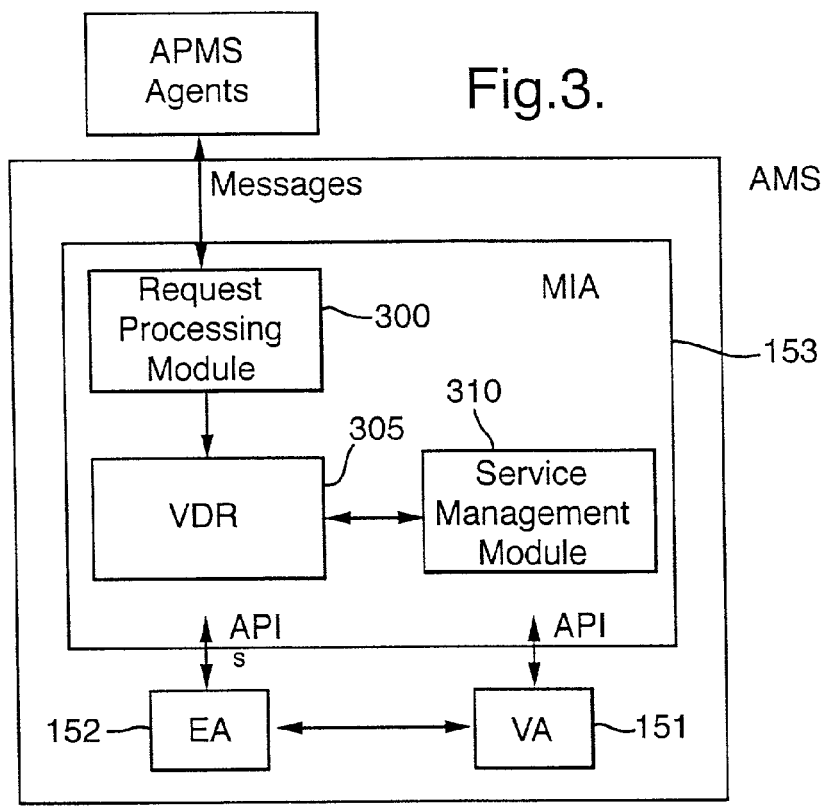
FIG. 3 shows a block diagram of a management information agent (MIA) for use in the AMS of FIG. 1.

Referring to FIGS. 1 and 3, an example of the AMS 100 used in visualisation might be as follows. (Although the following refers to a selected APMS 120, it could equally refer to another APMS 115 or to a different distributed system 125.) An APMS 120 is running, managing tasks and resources such as processes 140. In managing the tasks and resources, messages pass between the APMS 120 and the tasks and processes 140, and between agents 175 of the APMS 120. The agents 175 will also change state. Depending on the visualisation or engineering services selected in respect of the APMS 120, the APMS 120 will have registered those services with the AMS 100. For instance, the APMS 120 will have requested the AMS 100 to store data, including messages and/or states, in the Oracle database 155. The APMS 120 will transmit this data to the AMS 100 in accordance with the current definition of the service requested.

At the AMS 100, the MIA 153 will load this incoming data to the Oracle database 155 in a form relevant to the service, again as currently defined for that service.

A user, who may be at a personal computer as user interface 135 attached to the AMS 100 or attached to the TCP/IP network 110, or indeed attached to the APMS 120, desires to use the AMS 100 for a service in respect of the APMS 120. The user therefore accesses the service front end and selects, as an example, a visualisation request. The user is now offered a menu of different visualisation services, such as:

- 2D agency view
- 3D agency view
- agent view
- business process (domain) view

The user selects, for instance, the agent view by clicking on that item in the menu. This allows the AMS 100 to access a definition of the agent view visualisation service. The definition will require a particular GUI to be loaded from the GUI library 156 in order to present data from the Oracle database 155 to the user in a pre-determined manner. The AMS 100 will therefore search the GUI library 156 for the specified GUI. If the GUI tool is present in the library 156, the AMS 100 will start up the tool and use the MIA 153 to access the Oracle database 155 for the data relevant to that visualisation service, again as defined by the ontology library and as specified by the GUI tool.

If the GUI tool is not present in the library 156, the AMS 100 front end will notify the user that their service request cannot be satisfied.

3.2 Engineering Requirements for the AMS 100

The engineering agent (EA) 152 provides tools for timely analysis of agent performance based on key performance indicators, diagnosis of the causes of problems and the provision of statistics based on past agent performance.

In particular tools are provided to:

- classify agents into good and bad workers
- determine causes of non-contract compliance
- detect and indicate potential circularities in recursively defined services
- identify when new services are necessary (perhaps to overcome problem areas), and when existing services are sufficient to achieve an overall business objective
- determine the placement and distribution of services
- assist in realising management policies to be enacted by agents e.g. negotiation strategies; exception handling policies; resource management techniques and security policies
- identify cases where agent communication should be optimised
- group agents by their closeness. Closeness can be measured by the number of messages exchanged between agents, the number of SLAs made between agents, and so on
- display suitable warning messages whenever problems are detected such as that a monitored agreement has been broken For instance, the EA 152 may classify agents as good and bad workers by applying a threshold of 80% SLAs met for an agent to qualify as a good worker. Failure of a service is defined by the APMS agents and the EA simply provides measurement in that respect. The EA can though add considerable value by identifying agents that are often or consistently failing and thus indicating a possible diagnosis of a problem that needs resolution.

The EA 152 is equipped to send messages whose content is determined by the results of these functions and the sending of such messages, and their destination such as the relevant APMS, can be determined by the user.

3.3 Information Management Requirements for the AMS 100

The AMS 100 provides information services to both AMS agents and APMS agents. There are two main requirements:

1. to store information permanently and to provide this information storage service to other agents or systems; and
2. to allow information retrieval using high-level query languages.

The AMS 100 provides information to any agent if the request is reasonable. However, information security is also provided for instance such that confidential information cannot be accessed by any agent other than the owner. Techniques for this are known and further description is not given here. If an agent stores information, that agent can retrieve it whenever it requests.

In order to fulfil the requirements of the VA 151 and the EA 152, the information stored in the database 155 is as generic as possible. Some information translation will be provided by the AMS 100. The VA 151 and the EA 152 retrieve information from the MIA 153 by issuing high-level queries and/or Java Database Connectivity (JDBC) queries. However, information security should not be compromised.

3.4 Non-Functional Requirements for the AMS 100

From a non-functional perspective it is advantageous that the AMS 100 is:

- scaleable so it can handle varying numbers of agents/services/tasks
- robust so that despite all the potential crashes that might go on in an agent system, the AMS 100 does not hang
- able to display multiple independent windows in an open graphics environment, i.e. it provides respective windows for each service and/or for each agent
- able to run on many platforms
- able to deal with many agent systems connected at the same time
- able to take account of the various technologies that may be employed (now and in the future)

Preferably, it can filter out irrelevant information and limit the quantity of information displayed. The rate of information output can preferably be controlled by the user.

The visualisation and engineering system is preferably flexible and able to be used in conjunction with a large number of agent systems or distributed systems.

4. System Components and their Design Details

4.1 Management Information Agent 153

Referring to FIG. 3, at the highest level, the MIA 153 consists of three modules: a request processing module 300, a visualisation data repository (VDR) 305, and a service management module 310. The request processing module 300 communicates with APMS agents and processes messages accordingly. The visualisation data repository 305 defines methods for storing and retrieving information from MIA databases. It also defines a set of APIs which allow AMS agents to access the database via JDBC query calls and PL/SQL queries. The service management module 310 maintains a record of all VA and EA requests. It is also responsible for sending (or pushing) data to the VA 151 and/or the EA 152.

(Information on JDBC can be viewed at http://java.sun.com/products/jdbc/index.html. Information on PL/SQL can be viewed at http://www.oracle.com/)

Figure 4:
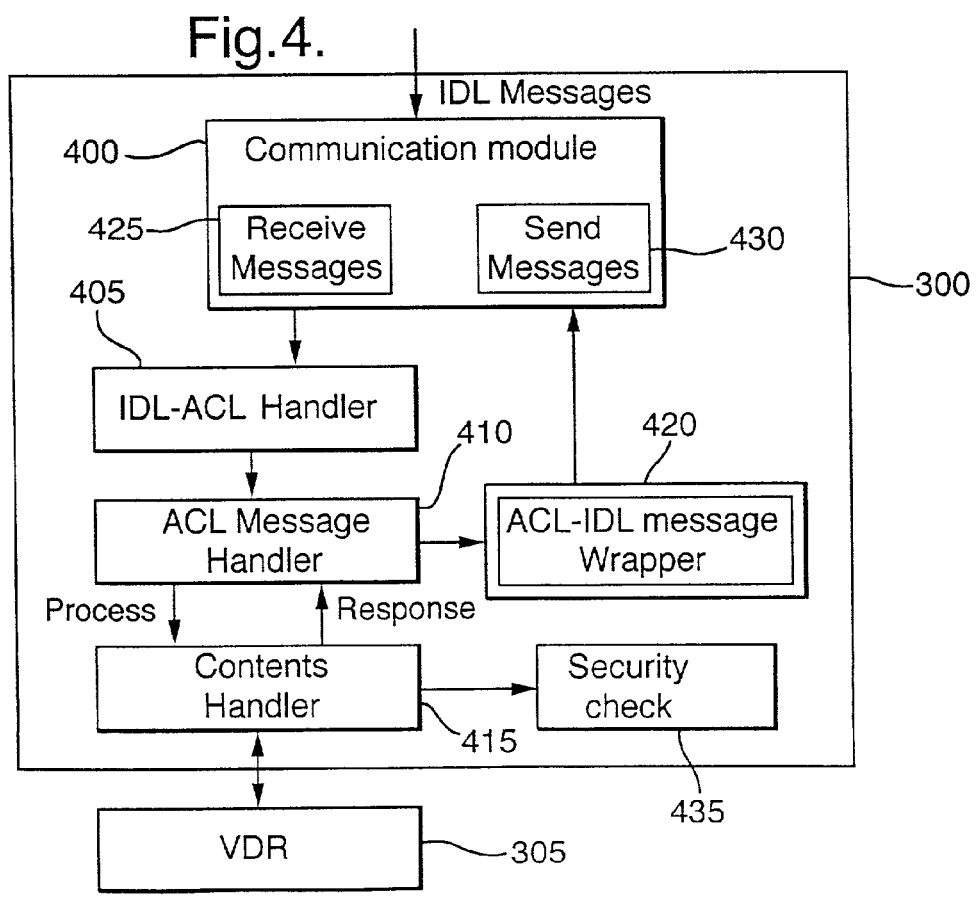
FIG. 4 shows a block diagram of a request processing module for use in the MIA of FIG. 3.

Referring to FIG. 4, the functional components of the request processing module 300 are as follows:

| | |
|---|---|
| Communication module 400 | Defines methods for sending and receiving messages from and to the APMS agents. |
| IDL-ACL message handler 405 | Messages from AMPS agents are IDL method calls. FIPA ACL messages are extracted from these IDL messages. |
| ACL message handler 410 | Processes FIPA ACL messages according to appropriate FIPA protocols and extracts message contents. However, contents are not processed here. |
| Contents handler 415 | Processes the request according to its current resources and objectives, and responds subsequently. In case of requesting information from MIA database, security check will be performed. |
| ACL-IDL message wrapper 420 | Wraps up FIPA ACL messages as IDL method calls and sends them to APMS agents via the send-message function defined in the communication module. |

Within the communications module 400, a receive messages module 425 defines CORBA IDL interfaces which can be called by ARMS agents. These interfaces are implemented as Java methods using the skeleton produced by the OrbixWeb IDL compiler. Similarly, a send messages module 430 defines CORBA IDL interfaces which can be used to send messages to the ARMS agents. These interfaces are also implemented as Java methods using the skeleton produced by the OrbixWeb IDL compiler.

At the heart of the MIA 153 is the VDR 305 which captures and stores information from APMS agents. Two types of information may be made available to the VDR from APMS agents:

Agent Communication—the messages that agents send and receive. The transmitter of information to the VDR could be either the sender or the receiver of the message, or both.

Agent State—the internal condition of an agent. The transmitter of information to the VDR would (normally) be the agent concerned, whenever its internal condition (state) changes. Note that the concept of 'state' for an agent can be expected to be specific to a particular ARMS. It will depend also upon the business monitoring and engineering requirements, agent co-operation policies, and effective authentication measures to protect the privacy of information.

Figure 5:
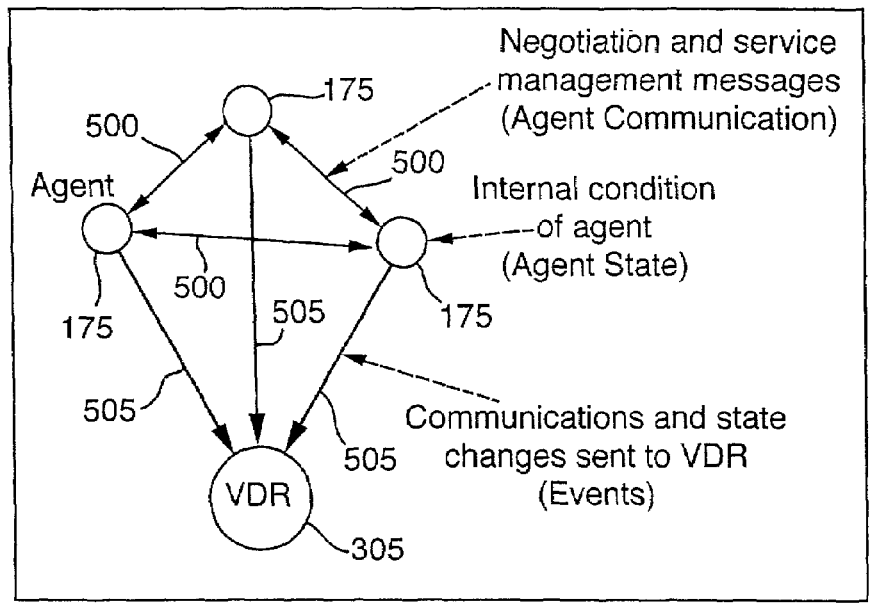
FIG. 5 shows communications paths for delivery of event information from and between agents of an APMS and a visualisation data repository (VDR) of the MIA of FIG. 3.

Referring to FIG. 5, a set of APMS agents 175 within an APMS 120 communicates amongst themselves using messages 500. Each agent 175 may undergo changes of state during use of the APMS 120. Both the messages and the state changes are represented as 'events' 505 that occur in the APMS 120 and are transmitted to the VDR 305.

Figure 6:
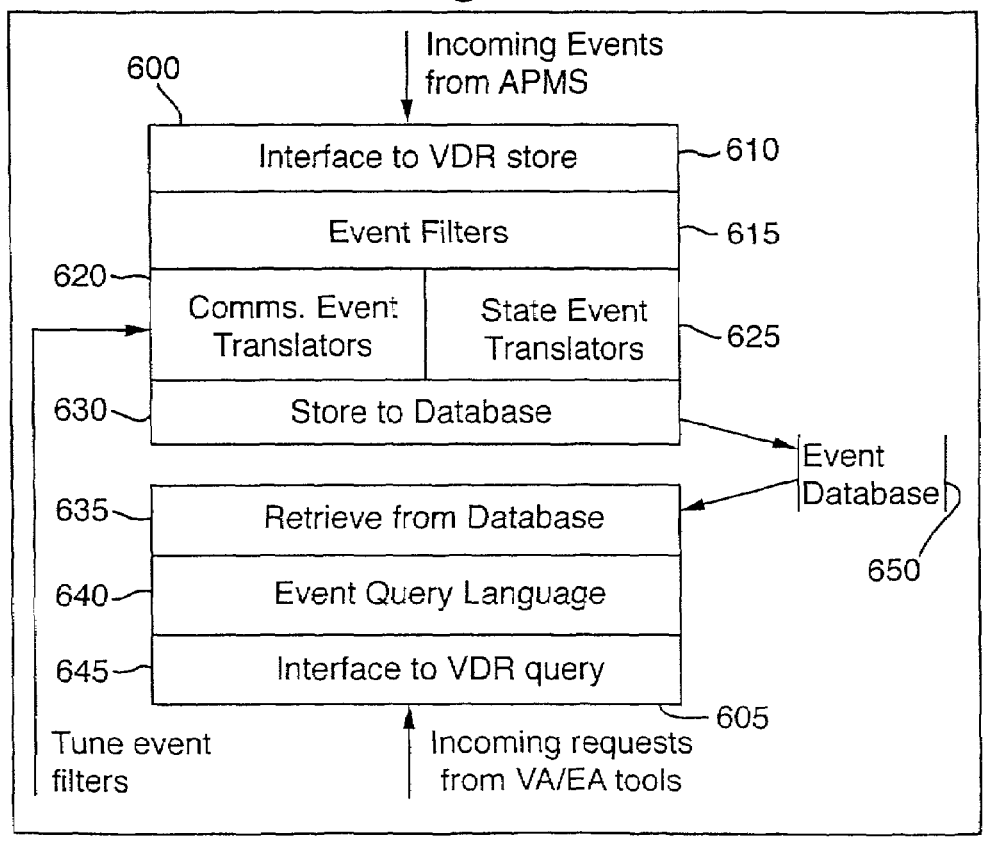
FIG. 6 shows a functional block diagram of the VDR of the MIA of FIG. 3.
Figure 7:
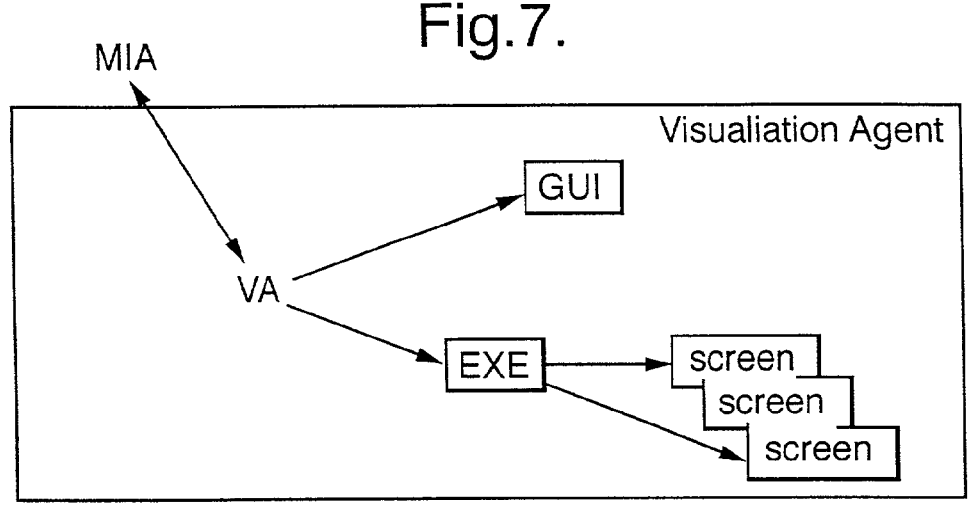
FIG. 7 shows the relationship between a visualisation agent (VA) of the AMS and the MIA of FIG. 3.

Referring to FIG. 6, the main components of the VDR architecture are the following:

Data collection module 600

This receives the incoming events 505 from the APMS 120, translates them into an internal (standard) format, filters out those that are not required, and stores the remainder into a database 650 (see later sections for details). The APMS accesses this module via a VDR-store interface 610.

Data retrieval module 605

This allows events to be recovered from the database by the VA and/or EA tools. In order to provide an abstraction from the underlying database technology, an Event Query Language is provided within this module. It allows the VA 151 and/or the EA 152 to define quite complex requests. For example, a query may request every negotiation message that agent A has received since 20:45:50 hours.

The data collection module 600 provides:

| | |
|---|---|
| Interface to VDR store 610 | Java methods which are called by Contents Handlers to add data to the event database 650. |
| Event Filters 615 | Pro*C filter programs which perform event filtering. Some irrelevant data is thrown away at this stage. |
| Comms. Event Translators 620 | PL/SQL programs that translate inter-agent messages to database syntax. |
| State Event Translators 625 | PL/SQL programs that translate intra-agent messages to database syntax. |
| Store to Database 630 | SQL insert statements. |
| The data retrieval module 605 provides: | |
| Retrieve from Database 635 | SQL select statements. |
| Event Query Language 640 | EQL parsers. |
| Interface to VDR Query 645 | APIs for VA/EA to retrieve data from the database. |

The filters select out data which will be redundant in the AMS 100. For instance, each APMS agent party to an agreed SLA will notify the AMS 100. Only one event signifying agreement of the SLA is required for the AMS 100 and the filters 615 will discard subsequent events notifying the same SLA.

The communication and state translators in the data collection module 600 are configurable to a particular APMS. The syntax of the communication messages and agent states in the APMS are mapped/converted into a standard event syntax by the translators. Semantic mapping is also required for instance to deal with naming discrepancies between APMS agents and the AMS 100 for the same service or task.

Filters and translators are further discussed below under the heading "4.5 Filters and Translators" and with reference to FIG. 14.

4.2 Visualisation Agent 151

Visualisation agents are responsible for constructing presentation screens according to requests from APMS agents. They interact with the MIA 153 through a set of AP Is. At the highest level, visualisation agents 151 can display agent information in three views: agency view, agent view and domain view.

Figure 8:
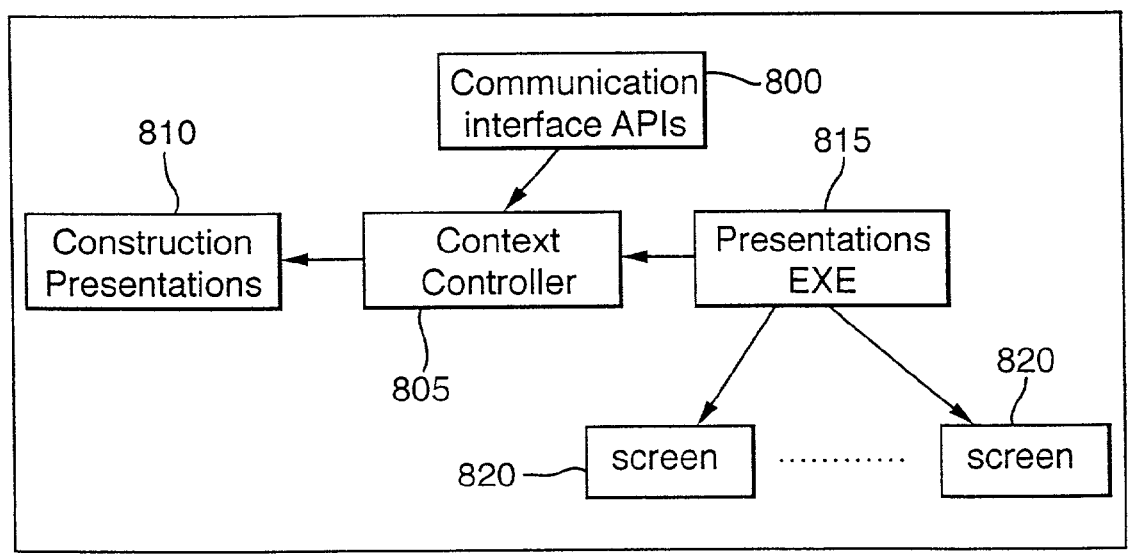
FIG. 8 shows a functional block diagram of the VA of FIG. 7.

Referring to FIGS. 2 and 8, the VA 151 interfaces to the MIA 153 by issuing a set of APIs 800 which are EQL queries. In particular, the following APIs are defined:

TABLE 1

VA and MIA APIs.

| | |
|---|---|
| setup (Agent, View) | set up the view View for agent Agent. |
| get_agent_state (Agent, Activity, States) | get the activity states for activity Activity of agent Agent, and put results in States. |
| add_information (Agent, Data) | MIA pushes the data Data of agent Agent to VA |

The VA 151 constructs presentation screens 820 according to requests and tools from its GUI library 156. It also keeps track of what presentation screens 820 are currently active and how to feed data to each presentation screen 820. The four functional components of the VA 151 and their relationships are as follows:

Communication interface 800:
defines a set of APIs for interfacing with the MIA 153, (see).

Context controller 805:
controls requests and decides whether the request can be provided.

Presentations constructor 810:
constructs the presentation screens 820 if the Context controller has decided that a request can be provided.

Presentation EXE 815:
enacts the presentation screens 820.

The context controller 805 keeps a record of what screens 820 are currently active and deletes them when they are no longer required. By monitoring the screen presentations already open for a user, the context controller ensures that only correct data is sent for those presentations. On receiving a request from a user, the context controller looks to see what is open. If the request requires a new GUI, the context controller provides that, or for instance provides a fail message to the user if it cannot.

Figure 15:
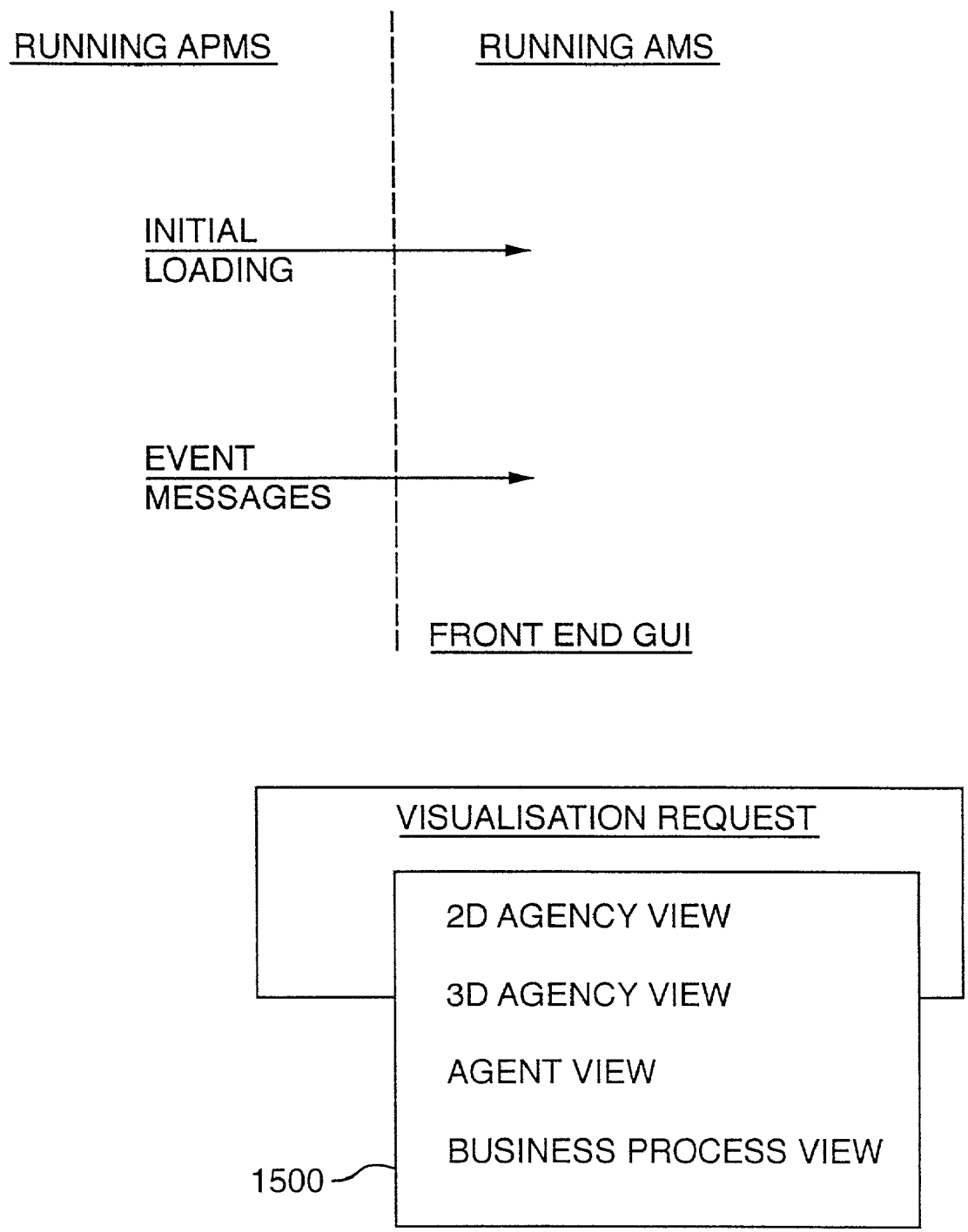
FIG. 15 shows a schematic diagram of a user interface response to a visualisation request.

Referring to FIG. 15, the way in which the user uses the VA 151 is as follows. The user may access the AMS 100 from any terminal 135, usually via an authentication procedure. The AMS 100 provides a graphical user interface at the terminal 135 by means of which the user can select an operation. This operation might be administrative or for use of the AMS with respect to a specific APMS, depending on the role and requirements of the user. If the user requires operation of a visualisation service, the user will select a visualisation request via the front end GUI of the AMS 100. If the user request comes via an APMS 115, 120, the AMS 100 may be equipped to identify that APMS as the subject of the visualisation request. Otherwise, the user will be prompted to identify an APMS 115, 120. The visualisation request will trigger the VA 151 to deliver browser capability to the terminal 135 for the user so that the user can download selected views of the APMS 115, 120 in question.

The browser will offer a drop down menu 1500 of the selection of views available via the VA 151 irrespective of the relevant APMS 115, 120. These might comprise the 2D agency view, the 3D agency view, the agent view and the business process view. The VA 151 can build each view using a tool from the GUI library 156 together with data extracted from the Oracle database 155. Selection of a view by a user constitutes a command which then runs the relevant tool. To present the view to the user, the VA creates files for downloading. The agency and agent views may be created as HTML or VRML files appropriately, and these constructed files are downloaded to the terminal 135 for the user. The business process view is expressed in a more relevant format, such as constructed by a DaVinci™ package. (The DaVinci package is a known graphical visualisation system and information is available over the Internet at URL:

http://www.informatik.uni-bremen.de/~davinci/docs/overviewF.html.)

4.2.1 Agency View Design

Figure 9:
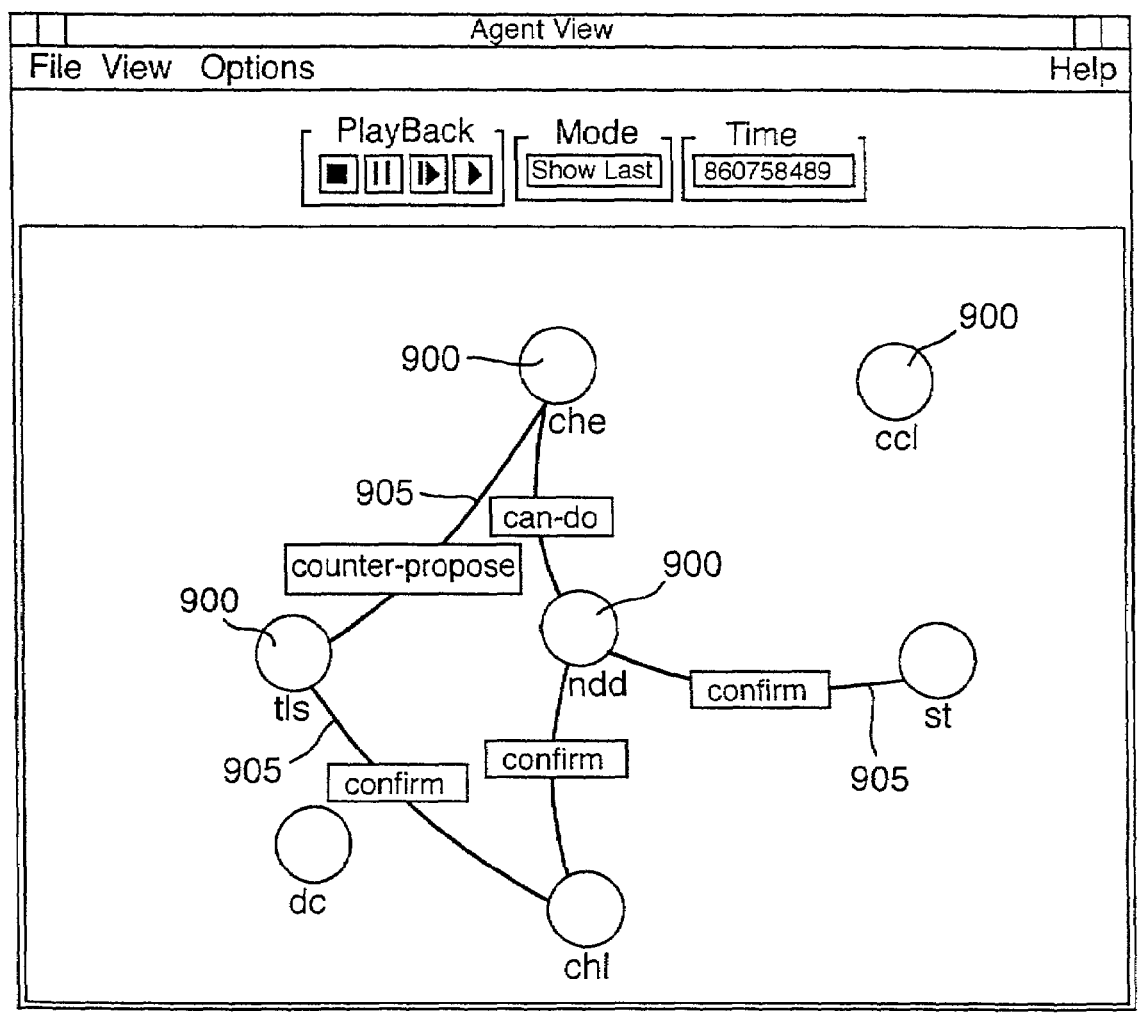
FIG. 9 shows a screen presentation of an agency view of an APMS, generated by the VA of FIG. 7.

Referring to FIG. 9, an agency view presents agents in an agent system and how they are organised and their interactions. In the view shown, agents are depicted by icons 900 and agent interactions (messages and contracts) are indicated by connecting lines 905.

There are a number of icons 900 which represent types of agents in agent-based applications. Each icon is intended to have intuitive meaning and can be selected or reselected by the user. The arrangement of agents in the agency view can be according to the hierarchy in their applications as designed by their designers.

The functionality is not limited to displaying messages and contracts. It also includes the ability to select agents, messages and contracts using a mouse pointer or other known means, to 'pull up' more detailed information. In the case of agents, for example, on selection of an icon 900 a menu allows the user to launch more views to display details of that agent's performance, resource allocation and other internal states. It also allows a user to drill down to agent views and domain views.

To support the AMS goal of allowing the user to customise views in-service to meet specific interests it also allows the user to configure the agency view. Configuration options include adding and removing agents from the view, positioning and repositioning the agents to create a clear and intuitive layout and selecting the type of messages or agreements which should be displayed.

The functions supporting the agency view consist of four main modules:

1. a view panel onto which the agents and links connecting them can be arranged and rendered. This panel is responsible for the overall layout of agent views and co-ordinates the drawing of links 905 between agent icons 900;

2. a node element module responsible for the icons 900 representing the agents on the view panel. In the agency view, the agents are represented at nodes of what is effectively a network. Each node is represented by an icon 900 in the agency view. These icons 900 must be able to adopt any number of appearances in order to express the type of agent being represented. They are moveable, together with the node they represent, by drag and drop operations and capable of being created and destroyed and added or removed from the display by the monitoring application. They are also required to be able to produce pop-up menus should the application require this.

3. a connecting line module is responsible for joining the icons. It allows them to represent any potential interaction between agents in whatever way the application desires. The connecting lines 905 must also be labelled or marked in some way such that the user can identify them. As with the icons 900, the lines 905 must be capable of producing pop-up menus to supply further information and other options to the user.

4. a menu module allows menus to be defined and attached to icons and/or lines.

4.2.2 Agent View Design

The agent view allows users to inspect information relating to any particular agent. This includes the resources available to the agent, their status, SLAs made and messages sent. This view is attached to an icon 900 or line 905 which represents the agent concerned. Selection of the icon by a user displays pull-down menus with menu items representing various aspects of agent details.

The VA 151 retrieves agent details from the MIA 153 and constructs the menus accordingly. When a menu item is selected, details about that particular aspect of the agent will be shown either as text or graphics such as line graphs, bar charts, etc. All agent data used by the VA 151 is retrieved from the MIA 153 which obtains agent states from APMS agents through appropriate FIPA communicative acts and protocols.

The VA 151 determines how to present information according to request types and what tools are available in the GUI library 156. The VA 151 maintains a list of events which in turn represent requests. When an event occurs, the VA 151 will check the event, get appropriate data and forward it to presentation screens.

The functions supporting the agent view consist of the following main modules:

Event module which is responsible for event handling. It keeps a list of events and how to respond when events occur.

GUI library module which is responsible for maintaining the GUI library 156. This includes a record of capabilities of presentation tools, adding new presentation tools and deleting existing presentation tools to and from the GUI library.

Data translation module which is responsible for transforming data to appropriate forms required by presentation tools.

Interface module which is responsible for interacting with the MIA 153. It defines a list of APIs between the MIA 153 and the VA 151.

4.2.3 Domain View Design

The domain view concerns the underlying business processes enacted by APMS agents. The domain view is responsible for constructing domain processes and displaying them. The domain view can construct business process views from PIF descriptions. If the business process is not in PIF format, domain specific programs have to be constructed manually. The following describes how domain views are constructed from PIF descriptions.

Figure 10:
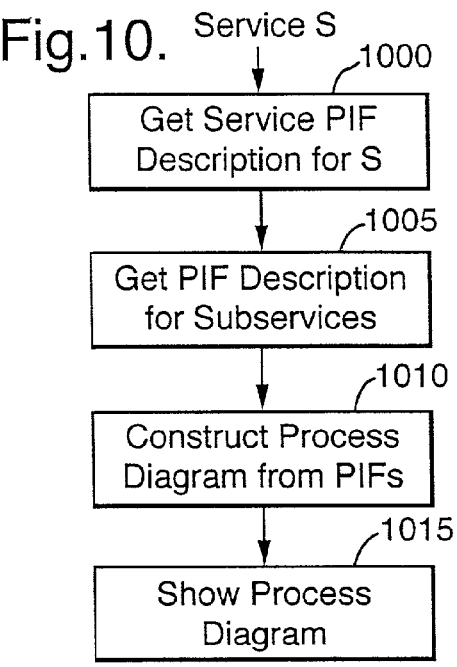
FIG. 10 shows a flow chart of steps in constructing a domain process view of an APMS, generated by the VA of FIG. 7.

Agent services are defined as PIF processes. Services are defined recursively, i.e. a service may be made up of a number of sub-services. Tasks are atomic services. Each agent holds PIF descriptions for the services it offers and the AMS database 155 holds PIF descriptions for the services managed by APMS agents, as loaded when the SLA between the APMS and the AMS has first been agreed. Domain processes are constructed from services made up those domain processes. The construction process is shown in FIG. 10.

Given an instance "s" of an agent's service, the domain process construction program first gets the service description PIFs from the agent (STEP 1000), and then identifies sub services and which agents offer which sub services. Next, sub service PIFs are obtained from agents in question (STEP 1005). The process diagram is constructed from all the component PIFs by analysing the relations between them (STEP 1010). Finally, the domain process is shown via the DaVinci package (STEP 1015).

Figure 11A:
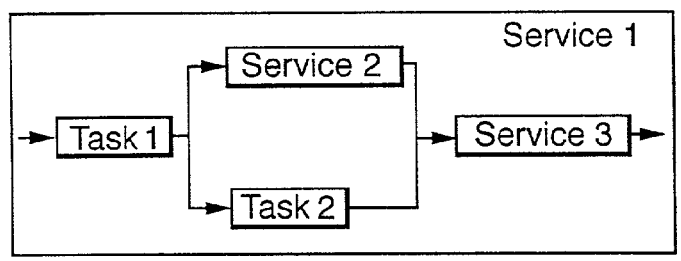
FIGS. 11*a, b* and *c* show three services provided by agents of the APMS, broken down into business processes.
Figure 11B:
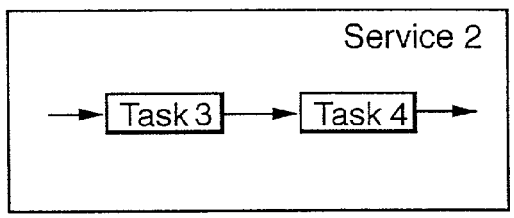
Figure 11C:
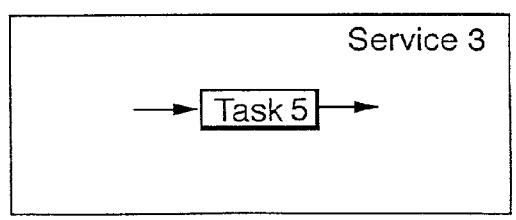
Figure 12:
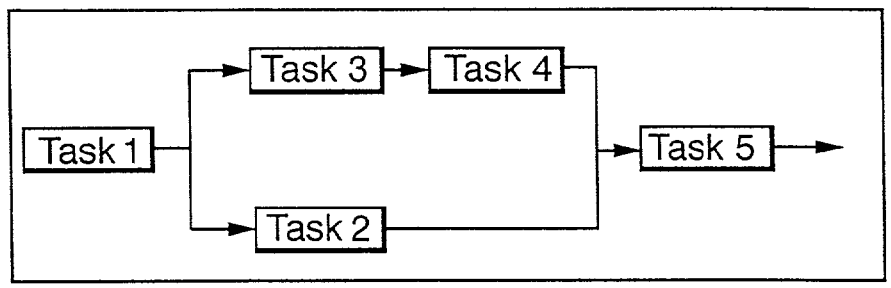
FIG. 12 shows as overall service provided by the agents of the APMS as a result of the three services of FIGS. 11*a, b* and *c;*

For example, let us suppose that agent A1 offers Service 1 for which the PIF process is as shown in FIG. 11*a* and Service 2 and Service 3 are offered by agent A2 and agent A3 respectively and are as shown in FIGS. 11*b* and 11*c*. The process construction program gets PIFs for Service 1 from A1, PIFs for Service 2 from A2 and PIFs for Service 3 from A3. The process diagram for Service 1 is constructed as shown in FIG. 12.

Domain processes are displayed by using the DaVinci package. The following steps provide the construction and displaying of processes:

Retrieval of PIF data from the AMS database 155 via the MIA 153.

PIF to DaVinci conversion which analyses PIF descriptions and construct display orders for all activities in the process.

4.3 GUI Library

The GUI library 156 holds a collection of presentation tools. They can be accessed by the Visualisation agent 151. Each tool has to be wrapped up (as mentioned above) before putting into the library.

In the VA 151, the details of presentation tools are represented by a vector of objects which specify types of the tools, data formats and how to invoke them. The GUI library 156 may hold for instance the following presentation tools:
   Dynamic menu constructions,
   DaVinci based tools to display business process diagrams,
   Clustering graphs,
   Line graphs,
   Bar charts in 2D/3D,
   Pie charts, and
   Percentage graphs.

4.4 Engineering Agent

Figure 13:
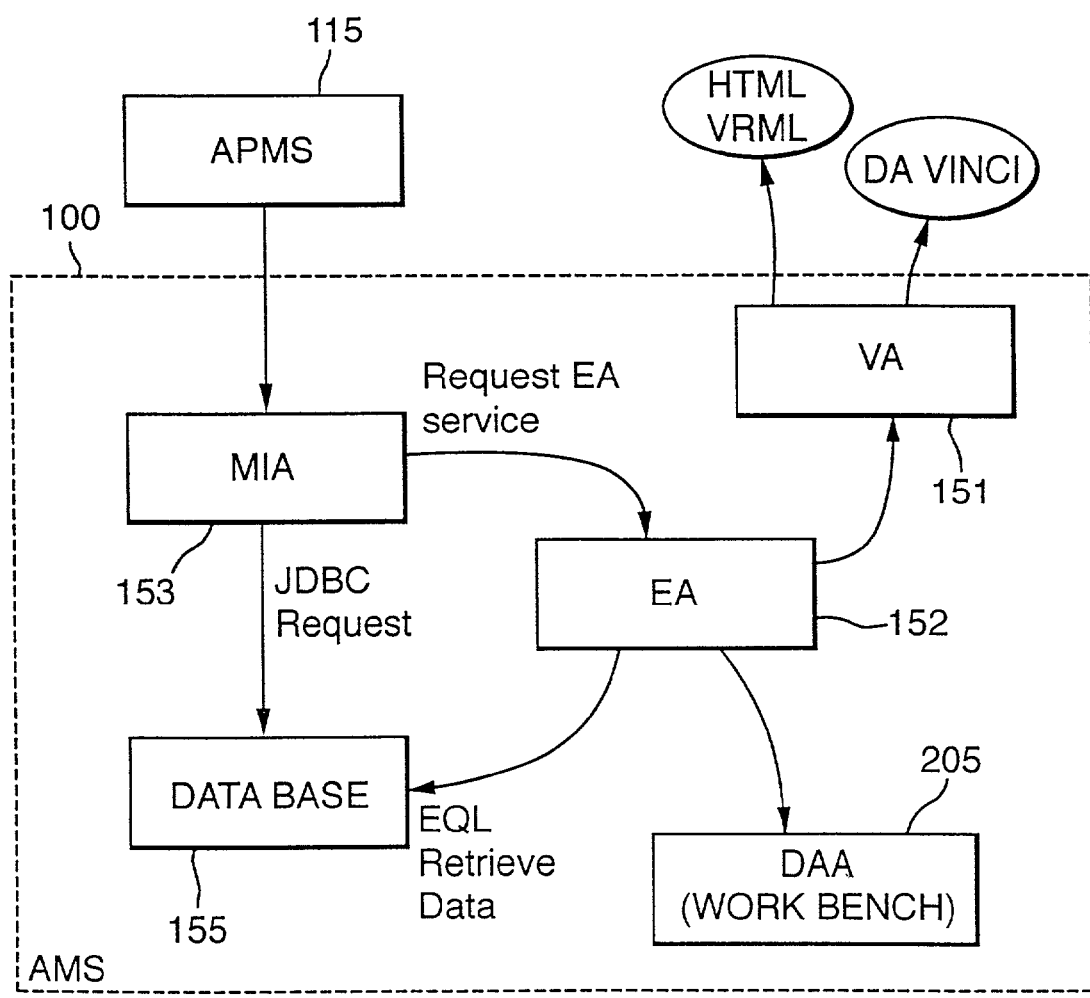
FIG. 13 shows an engineering agent (EA) of the AMS and its interactions with other components of the AMS in providing data analysis and screen presentation of the results.

Referring to FIGS. 2 and 13, the EA 152 is responsible for in-service agent engineering and decision support. The overall architecture of the engineering agent is as shown in FIG. 13. It has a core processing component for the EA 152 and interfaces to the MIA 153, Oracle database 155, data analyser 205 and the VA 151. The interface to the database 155 is via a wrapping component which provides to the EA 152 a high-level, MIA-independent event query language for retrieving data.

Requests may be received by the EA 152 either from an APMS 115, 120, a distributed system 125 or a user via a terminal or personal computer 135. A request identifies the service required of the EA 152 and is received as a message. The MIA 153 which receives and processes all incoming messages to the AMS 100 runs a check on whether data necessary for provision of the service is present in the database 155. If the data is missing, the MIA 153 returns the request for the missing data. If the data is present in the database 155, the MIA 153 passes on the request as a message to the EA 152. The EA constructs an EQL request to retrieve data from the database 155. If the incoming service request identified a service in relation to the business processes managed by the relevant APMS 115, 120 or distributed system 125, the data the EA 152 downloads from the database 155 will include the PIF service descriptions for the services managed by the APMS 115, 120. The EA 152 will construct a business process from the PIF descriptions, as described above with reference to FIGS. 11 and 12, and send the constructed process or processes to the data analyser 205.

The data analyser 205 may comprise any data analysis tool which can support services the EA 152 may have to provide. An example of such an analysis tool is the concurrency workbench, a semantic based tool for the verification of concurrent systems. Publications in relation to this tool include "The Concurrency Workbench: A Semantics-Based Tool For The Verification Of Concurrent Systems" by Cleveland R, Parrow J, and Steffen, B, published in the proceedings of the Workshop On Automated Verification Methods For Finite-state systems, Lecture Notes On Computer Sciences 407, published by Springer-Verlag in 1989, and "The Concurrency Workbench: A Semantics-Based Verification Tool For Finite-State Systems" by the same authors, published in ACM Transactions on Programming Languages and Systems, TOPLAS, 15(1): Pages 36–72, 1993. The Workbench is also available over the Internet at http://www.dcs.ed.ac.uk/packages/cwb/. It is however necessary to translate business processes expressed in the Process Interchange Format (PIF) to the calculus of communicating systems (CCS) in order to use the Workbench. However, it is then possible to verify properties such as deadlocks, livelocks, safety and liveness. The EA 152 communicates with the Workbench by making function calls.

The EA 152 is capable of displaying various views in relation to business processes managed by agents of the APMS 115, 120. The service request identifies whether for instance the EA 152 should display business processes themselves, for instance using the DaVinci package, whether to display a summary of business processes, for instance using an HTML file or whether to only display information where a problem has been identified. The EA 152 interacts with the VA 151 in order to display information. For instance, the EA 152 may deliver suitable browser functionality to the VA 151 together with content for display via HTML, VRML or DaVinci files.

Given data accessed from the database 155, the EA 152 can generate results in various formats. For the agency view, it can produce a 3D trace of the agents' communications and it can also provide a 2D clustering of agents to visualise their closeness, as well as a page containing statistical information on the multi-agent system. For particular agents, the EA can provide a detailed analysis of the agent's performance including a recommendation concerning its workload. For the domain view, the EA 152 provides monitoring of the SLA execution. To realise this service the EA translates the temporal order of business process SLAs into a graphical language understandable by the graphical drawing tool DaVinci.

The interface to the visualisation agent 151 is a thin component since the EA 152 provides most results as HTML, VRML, DaVinci pages or Java applets. (It is the applets which deliver the browser functionality to the VA 151.)

The engineering agent (EA) accesses data which has been loaded to the database 155 by the Management Information Agent (MIA) 153, processes it and makes it available for presentation to the user or information of other agents. The data available from the MIA comprises sender ID, receiver ID, sending time-stamp, receiving time-stamp, message type, message contents, and application-dependent information on tasks, services, and service level agreements, etc. The methods to analyse this data can be grouped according to their complexity.

First, there are syntactical methods which comprise counting the number of messages and amount of data sent and received by an agent, a list of agents a particular agent is in contact with, and a list of speech acts the agent received and sent. The latter is used to classify the agent's ôle.
   Second, the engineering agent provides information on the service level agreements the agents commit to and carry out. It provides statistical data on the number of SLAs agreed to and finally carried out, the amount of time per SLA, overall, minimal, maximal time, etc. According to this data, agents are classified as good or bad workers.
   Third, based on the information of capacity of workload, work committed to, and work actually carried out, the engineering agent can recommend policies to increase the performance of agents. If an agent commits itself, for example, to too much work, but actually carries out little of it, the engineering agent will recommend a more moderate bidding policy for at least that agent.
   Fourth, given the agents' local process descriptions, the engineering agent generates the global process (i.e. the overall business process run by the relevant APMS).

Fifth, the engineering agent analyses the agent's processes and may detect deadlocks in the process or verify that the process meets a given specification or satisfies certain properties.

Sixth, the engineering agent provides a 3D visualisation of the agents' communication trace.

Seventh, the engineering agent clusters the agents dynamically according to their distance which is defined by the number of messages exchanged between two agents and which evolves during the performance of the agent system.

4.5 Filters and Translators

Filters and translators are referred to above, with reference to FIG. 6. Filters are programs which receive messages from external agents and filter out unwanted information. Translators take outputs from filters, transform them into SQL insert statements and populate the database.

Filters and translators are application dependent. They have to be written for each application. Filters take the requirements of current tables and their descriptions and determine whether a given message from an application should be passed to translators. If a message is not relevant to any table, the message is thrown away and filters wait for next message.

Translators understand the exact syntax of a message and how information should be extracted from it. Type conversions are often required because different systems may use different types. Again translators cannot be designed generically.

Figure 14:
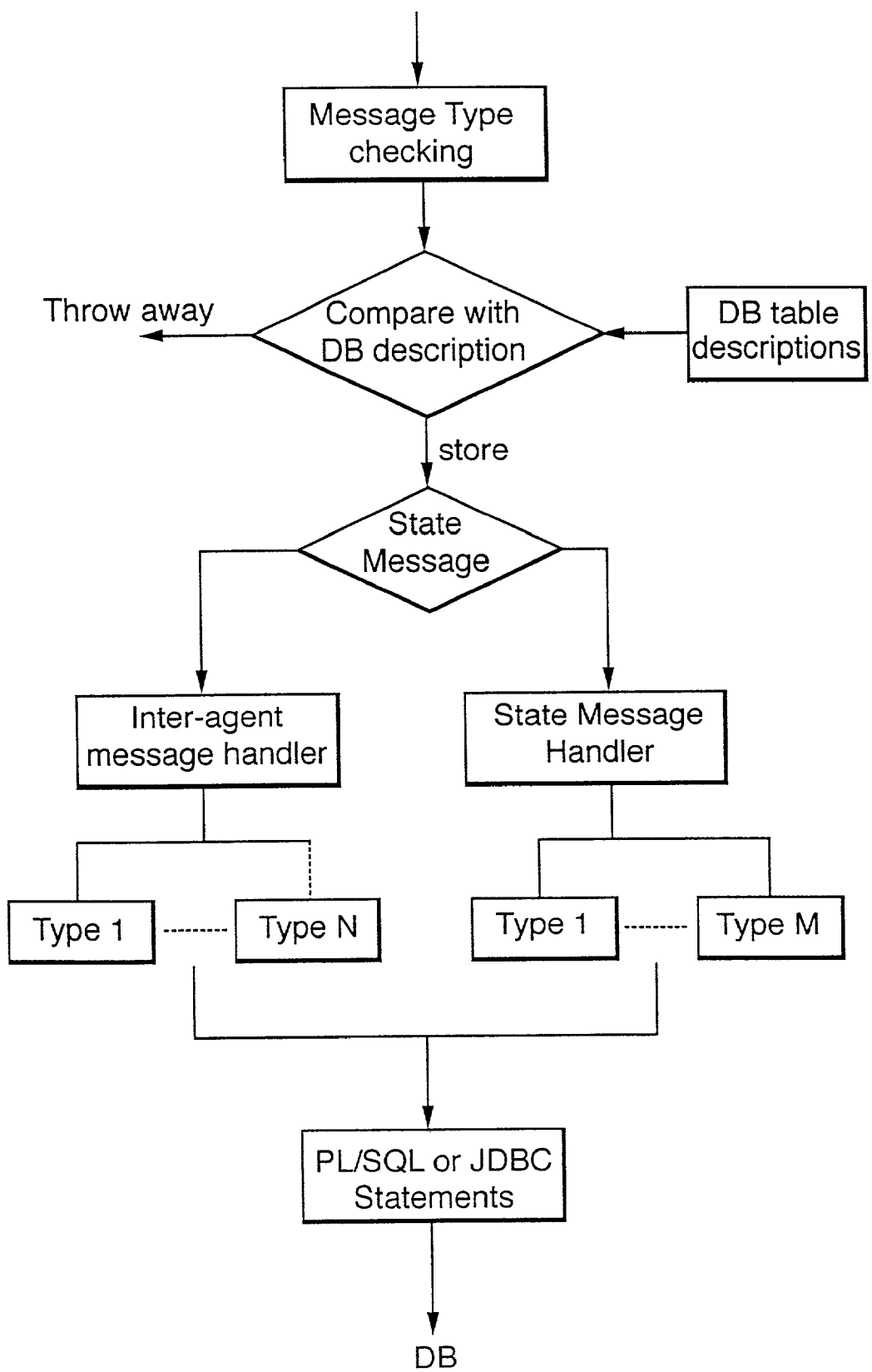
FIG. 14 shows a flow diagram of filtering and translating proceses for use in the VDR of FIG. 6.

FIG. 14 shows a flow diagram of the filtering and translating processes.

5. System Design Details

This section describes system-wide design details which are not specific to particular components in the infrastructure 5.1 Communications Mechanisms AMS agents communicate with other agents by exchanging FIPA messages. The transportation is based on the CORBA standard. Each agent defines a set of standard IDLs which are required by any CORBA implementation. In this particular case, OrbixWeb from IONA inc. is used.

Each FIPA communicative act is represented by a one-way method of IDL interface FIPA_CORBA. Each method specifies all possible keywords which may be required by that act. The keywords are specified in a fixed order.

The interface is implemented in JAVA. The implementation of each IDL method is responsible to translate this CORBA representation into FIPA ACL.

5.2 FIPA ACL

AMS deals with requests from external agents. These requests are: requesting visualisation services, storing information services and analysing agent performance. In order to provide certain services, AMS need data from external agents so that FIPA ACL requests to external agents are issued. Only a subset of FIPA ACLs are required. AMS can process the following FIPA communicative acts:

| | |
|---|---|
| inform | The sender informs the receiver that a given proposition is true. |
| request | The sender requests the receiver to perform some action. |
| request-when | The sender wants the receiver to perform some action when some given proposition becomes true. |
| request-whenever | The sender wants the receiver to perform some action as soon as some proposition becomes true and thereafter each time the proposition becomes true again. |
| subscribe | The act of requesting a persistent intention to notify the sender of the value of a reference, and to notify again whenever the object identified by the reference changes. |
| cfp | The action of calling for proposals to perform a given action. |
| cancel | The action of cancelling some previously requested action which has temporal extent. |
| failure | The action of telling another agent that an action was attempted but the attempt failed. |
| not-understood | The sender of the act informs the receiver that it perceived that j performed some action, but that it did not understand what j just did. |

Figure 16:
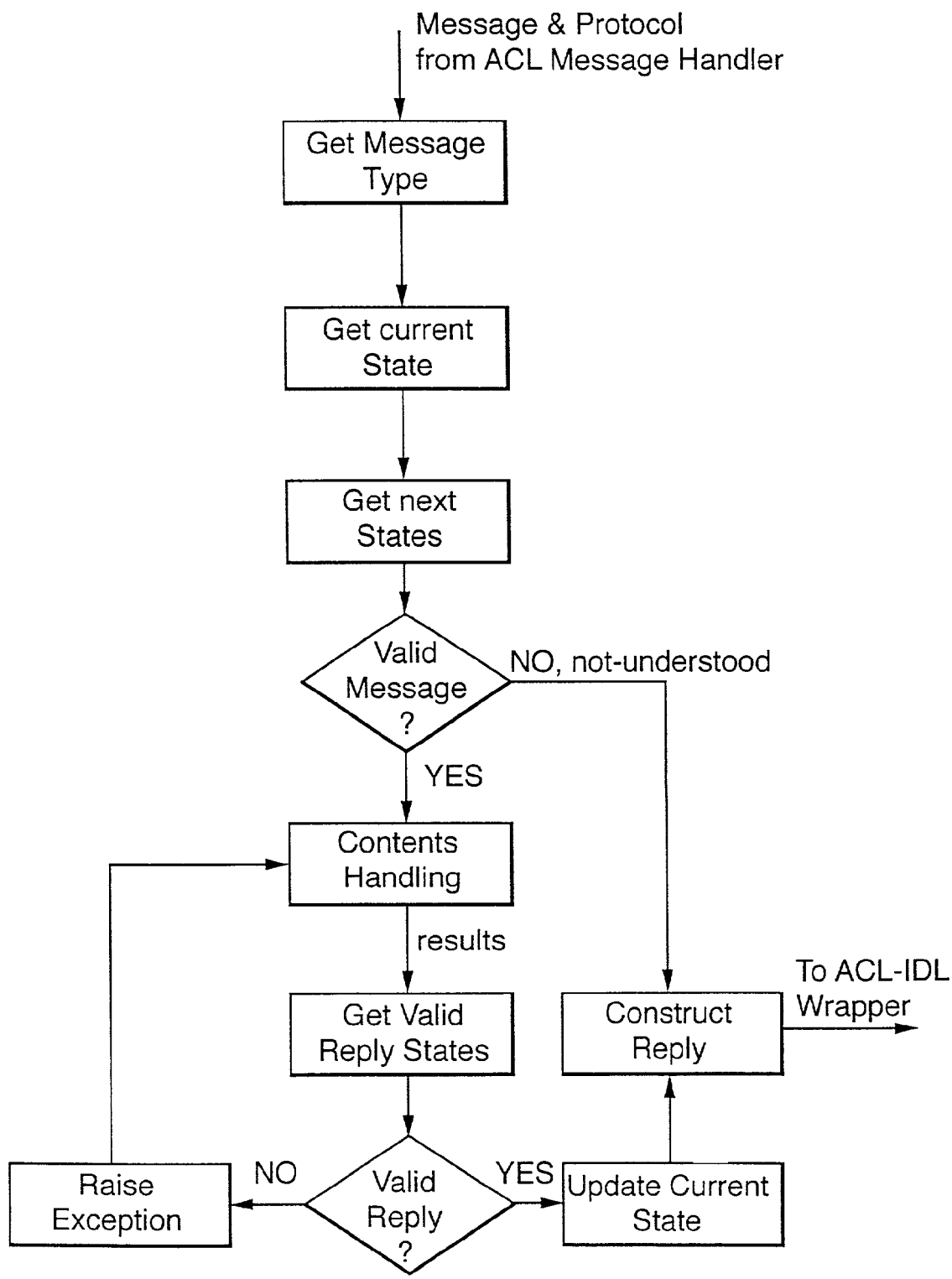
FIG. 16 shows a protocol for handling messages in the MIA of FIG. 3.

Each message has compulsory keywords and optional keywords. The contents language used is PIF. The following is a list of compulsory keywords associated with each message.

inform: agent-id, conversation-id, contents request: agent-id, conversation-id, protocol-used, contents request-when: agent-id, conversation-id, protocol-used, contents, conditions request-whenever: agent-id, conversation-id, protocol-used, contents, conditions subscribe: agent-id, action cfp: agent-ids, conversation-id, protocol-used, contents cancel: agent-id, conversation-id, action-id failure: agent-id, conversation-id, action-id not-understood: agent-id, conversation-id, protocol-used, contents FIPA messages may obey certain FIPA protocols. AMS FIPA protocol processing is shown in FIG. 16. FIPA protocols are represented as Java objects. A protocol object represents an instance of a FIPA protocol, which is defined as a sequence of states. Methods are defined to update the protocol, to get the current state, to get next valid states and to get valid reply states.

The protocol handler of the MIA 153 takes an instance of a FIPA protocol, a message and the protocol followed by the message. Upon receiving a message, it extracts the message type, i.e. state in the protocol terms. Then it checks this message against the protocol by comparing the message type with the valid next states which can be obtained given the current state (IDL-ACL handler 405). If the message follows the protocol, the message contents are extracted (ACL message handler 410) and the contents handler 415 is called. If the message does not follow the protocol, a not-understood reply is constructed.

After contents processing, the protocol handler checks if the results are valid replies by comparing with next valid reply states. If the reply is not valid, an exception is raised to the contents handler 415. Otherwise, it constructs the reply and then the processing passes to the ACL-IDL wrapper 420.

5.3 Event Query Language

Event Query language is used by AMS agents to store and retrieve information from its VDR 305. It is based on SQL with temporal information added.

5.3.1 Time Representation

To represent states and state transitions, a notion of time is required. AMS uses discrete time points to represent temporal information. This point-based temporal logic is sufficiently expressive to represent events from agent systems. The reason is that all data are captured by messages from agent systems and those messages are sent discretely at particular points in time. Although a point-based temporal logic is sufficient to time stamp messages, it is not flexible or convenient enough to express visualisation and engineering queries. For example, Display the state of agent A at the completion of Task B.
Display resource usage during service C.

These types of queries cannot be easily constructed using a point-based temporal logic.

In MIA databases 155, all temporal information is represented as time points. AMS queries can use an interval based logic.

5.3.2 Event Query Language

AMS Event Query Language uses SQL to create and to populate database tables. The retrieval parts are extended to allow users to express queries to use an interval logic and an event logic. In the AMS, Allen's interval logic can be used. This was published for instance in ACM Communications 35 (11), 1983.

The AMS 100 defines a very simple event logic. Services and tasks are the only events. Valid logical symbols are: and, or, before, after and just-after. Their meanings are:

| | |
|---|---|
| and | logic AND |
| or | logic OR |
| before | time before an event, i.e. a service or a task |
| after | time after an event, i.e. a service or a task |
| just-after | a time point at which an event finishes |

Apart from using the above to construct queries, the MIA 153 also provides a set of high-level APIs for the VA 151 and EA 152. Typical API queries from these are:

Retrieve all tasks of agent agent-id.
Retrieve the state of a task at time point i.
Retrieve states of a task over time interval i.
Retrieve all the active instances at time i.
Retrieve all the time points where there are state changes.
Retrieve all negotiation messages sent out by agent agent-id.
Retrieve all negotiation messages received by agent agent-id.
Retrieve all negotiation messages between agent agent1 and agent agent2.

This set of queries can be easily defined. In APMS agent systems, resources are tasks. Thus the status of an agent at time ti is the statuses of all its task instances. Task instances in APMS agent systems are predefined. Thus there are a fixed number of task instances at any particular time point or finite time intervals.

APIs are implemented in JAVA/JDBC and/or Pro*C/PL SQL. All API functions first parse the inputs, then construct SQL queries and finally returns a set of answers.

The above example API queries are coded as the following SQL queries:

Retrieve all tasks of agent agent-id
select task-id from agent-task-instance
where agent-id=agent-id;
Retrieve the state of a task at time point i.
select state from task-instance
where time=i;
Retrieve states of a task over time interval i.
select state from task-instance
where time >i1 and time <i2;

(Note that time points i1 and i2 are derived from time interval i by the API program after examining all time points in the database.)

Retrieve all the active instances at time i.
select task-id from task-instance
where state='active' and time=i.
Retrieve all the time points where there are state changes.
select distinct time from task-instance;
Retrieve all negotiation messages sent out by agent agent-id.
select message-id from event
where agent-id=agent-id and origin=0;
Retrieve all negotiation messages received by agent agent-id.
select message-id from event
where agent-id=agent-id and origin=1;
Retrieve all the negotiation messages between agent agent1 and agent agent2.
select message-id
from event, message
where
(event.event-id=message.event-id) and
(agent-id=agent1 or agent-id=agent2) and
(origin=0 or origin=1) and
(message.sender/receiver=agent1 or
message sender/receiver=agent2);

5.4 Contents Ontology

The contents ontology in the AMS 100 defines a common shared vocabulary which APMS agents 172, 175 can use to construct their requests to AMS agents 150. It defines a set of terms and their semantics. AMS contents ontology is classified into three categories: MIA, VA and EA.

5.4.1 MIA Ontology

MIA ontology includes all table definitions in the MIA database 155 plus the following:

```
store_message {
    agent: a1,
    message-type: t1, t2, . . .
}
store_message {
    agent: a1, a2, . . .
    time_interval: time
}
```

5.4.2 VA Ontology

VA ontology includes:

```
agency-view {
    agent: a1, a2 . . .
    message-type: m1, m2 . . .
    time-interval:
    start-time:
    display: 2d or 3d
}
agent-view {
    agent: a1
    tasks: t1, t2, . . .
}
domain view {
    service: service-id
    details: task-level
    animation: no
}
```

5.4.3 EA Ontology

EA ontology includes:

```
check-SLA {
    agent: a1
    SLA: s1
}
performance-report {
    agent: a1
    style: html
}
```

5.5 Database Tables

The VDR 305 uses the Oracle database 155 to store information from the agents 172, 175 in the APMS 115, 120. There are two sets of database tables in the VDR.

Tables in the first set are used to store inter-agent messages, which are messages sent or received by agents. This set of tables is generic and can be used to store inter-agent messages from agent system, because inter-agent messages of agent systems have similar sub-components. For example, every inter-agent message has a sender and a receiver, and is normally associated with a type such as propose, acknowledge, refuse, etc.

Tables in the second set are used to store internal states of agents. Unlike inter-agent messages, agent states are system specific, and cannot be defined without reference to a particular agent system. Therefore, a set of tables has to be designed for each agent system to meet its specific needs.

All messages from agent systems are recorded in the VDR database 155 whether they are inter-agent messages or state reporting messages. The VDR 305 uses events to refer both to inter-agent messages and to state reporting messages. Inter-agent messages are simply called messages. In the following, a summary of all tables in the first set and some of the tables in the second set is presented.

5.5.1 Inter-Agent Message Events

Figure 17:
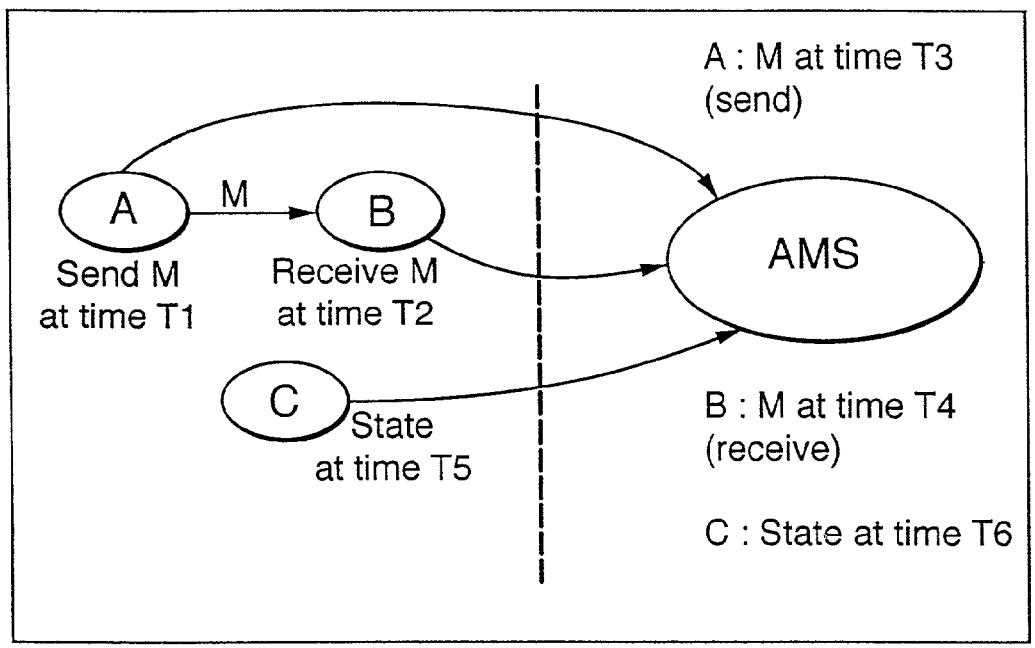
FIG. 17 shows a relationship between agent messages and events.

There are three tables in the first category; they are event table, message table and message-contents table. FIG. 17 shows the relationship between agent messages and events.

- M: the message from agent A to Agent B
- T1: the time at which agent A sends out the message M
- T2: the time at which agent B receives the message M
- T3: the time at which the visualiser receives the notification from agent A, eg. Sending the message M at time T1
- T4: the time at which the visualiser receives the notification from agent B, eg. Receiving the message at time T2
- T5: the time at which the agent sends its state report to the visualiser
- T6: the time at which the visualiser receives the status reports from agent C Event Table event table holds every event from agent systems. It has six attributes: event-id, agent-id, a-time, v-time, origin, and system.

- event-id: a unique id. for an event. It is generated by the VDR and is used as the primary key for the event table.
- agent-id: the id. of the agent which generated the event.
- a-time: the time at which the agent agent-id sent or received the message, or sent its state report. For example, if the message was sent by agent A to agent B, and this event was sent to the VDR by agent A, then agent-id is A and the time is the time at which agent A sent the message to B. If the event was from B, then agent-id is B and the time is the time at which agent B received the message.
- v-time: the time at which the VDR receives the event.
- origin: a number denoting the origin of the event. It is 0 if the event was from the message sender; it is 1 if the event was from the message receiver. It is 2 if the event was reporting an agent state.
- system: the agent system id. This is required because we use the same set of tables to record all messages from agent systems.

Message Table message table is used to record all inter-agent messages. It is not used to store agent state reporting messages. This table has four attributes: event-id, message-id, sender/receiver and message-type.

- event-id: foreign key reference to the event table.
- message-id: message id. used by the agent system. If the agent system does not use message ids., VDR will generate a message id. for every inter-agent message.
- sender/receiver: agent-id. Its value depends on where the event comes from. If the event was from the message sender, it is the receiver agent id. Otherwise it is the sender agent id. The agent-id of the event table and the agent-id of the message table together provide information of a message's sender and receiver.
- message-type: the type of the message. Message type is very useful information made explicit by the VDR. There are many queries which are only concerned with message types instead of message contents.

Message-Contents Table message-contents table is used to store raw messages. It has two attributes: message-id and message-contents. Although one inter-agent message generates two entries for the event table and message table, the raw message is only recorded once in the message contents table.

- message-id: the id. of the message.
- message-contents: the actual message.

5.5.2 Agent-State Events

Tables in this category have to be defined for each agent system. The following summarises some of the state tables for a selected APMS 115, 120. There are eight tables used to store the agent states of the system. It should be noted that data used to populate these tables may be derived from inter-agent messages. An appropriate filter has to be written for each APMS system to extract this information.

States of the APMS agents 172, 175 reflect the usage of resources which include services, tasks and service level agreements. Tasks have instances, and these instances have execution ids.; each execution instance has states. Services consist of tasks and can also include other services (see FIG. 11).

Agent_Task Table agent_task table is used to record tasks controlled by agents. It uses a composite primary key (agent id. and task type) because many agents could perform the same tasks.

Agent_Task_Instance Table agent_task_instance table is used to record a task and its instances that are controlled by an agent. This table is necessary because instances of tasks can be deleted. Thus there are tasks which do not have any instances.

Task_Instance Table task_instance table is used to record instance states. The time associated with each state is the time at which the instance starts to be in that state. Thus only the state transition is recorded in the database.

Similarly there is a set of service tables: agent_service, agent_service_instance, service_instance. These service tables are analogous to the task tables above.

The other two tables in the second category are service_task table and agent_sla table. service_task table is used to record the association between a service and tasks or other services. agent_sla table records all the service level agreements. An example of an agent_sla table is as follows:

| agent1 | agent2 | sla_id | service_name | Starting Time |
|--------|--------|--------|--------------|---------------|
| $a_1$ | $a_2$ | 123 | provide_cust_ser | 9.30 am |
| $a_1$ | $a_3$ | 234 | provide_cust_ser | 9.30 am |

An example of a service_task table is as follows:

| Task | Service | Time |
|------|---------|------|
| T1 | S1 | |
| T2 | S1 | |
| T3 | S1 | |
| Tn | S1 | |

The time column of the service_task table can only be instantiated when a service or task is actually run as this is the start time of the service.

5.6 Presentation tools

This section covers the presentation screens, particularly for the "Domain View", coded by the AMS 100. The Agent and Agency views are commented on above.

Domain view

The domain view shows details about the underlying processes enacted by agents. This includes contract compliance, task and resource usage, business process execution, etc. Typical domain views are shown in FIGS. 18–24.

Figure 18:
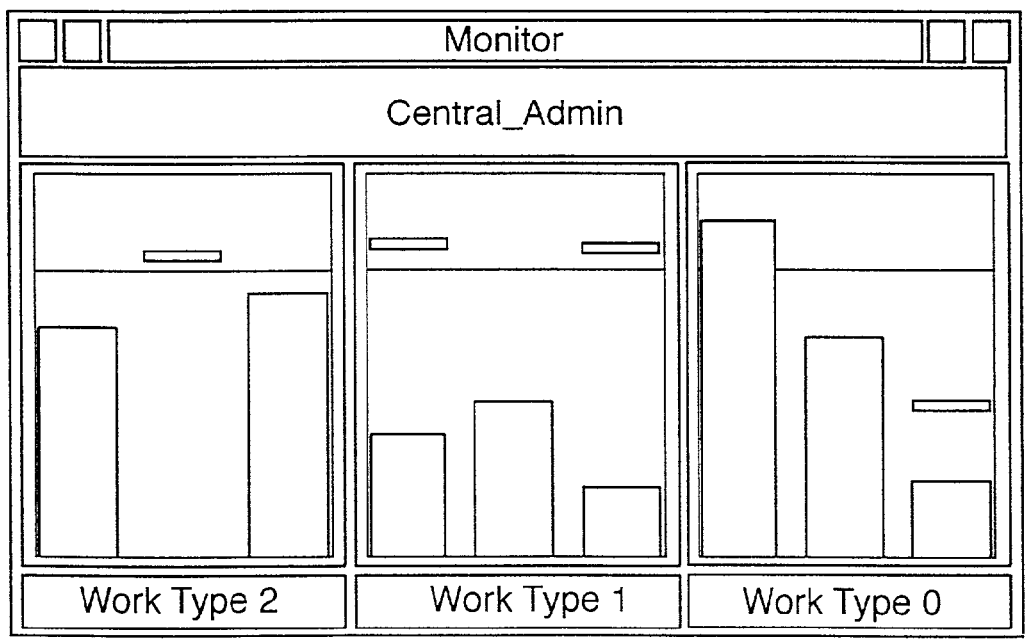
FIGS. 18 to 24 show various process views generated by the engineering agent of FIG. 13.

Referring to FIG. 18, the contract compliance view shows the work actually carried out as bar charts and the previously agreed amount as a line.

Figure 19:
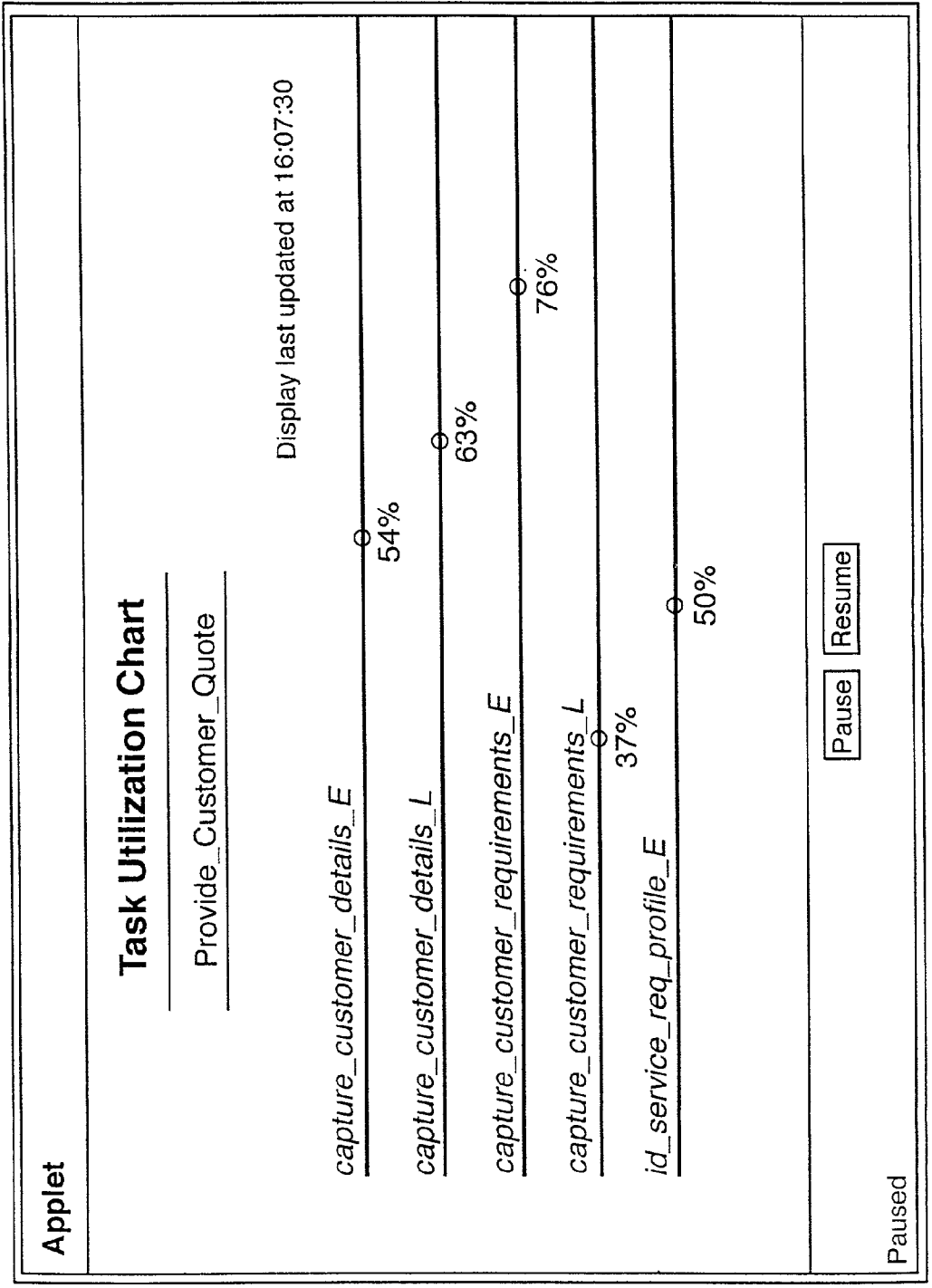

Referring to FIG. 19, the Task Utilisation Chart is in the form of a dynamic 'ruled' chart diagram.

Figure 20:
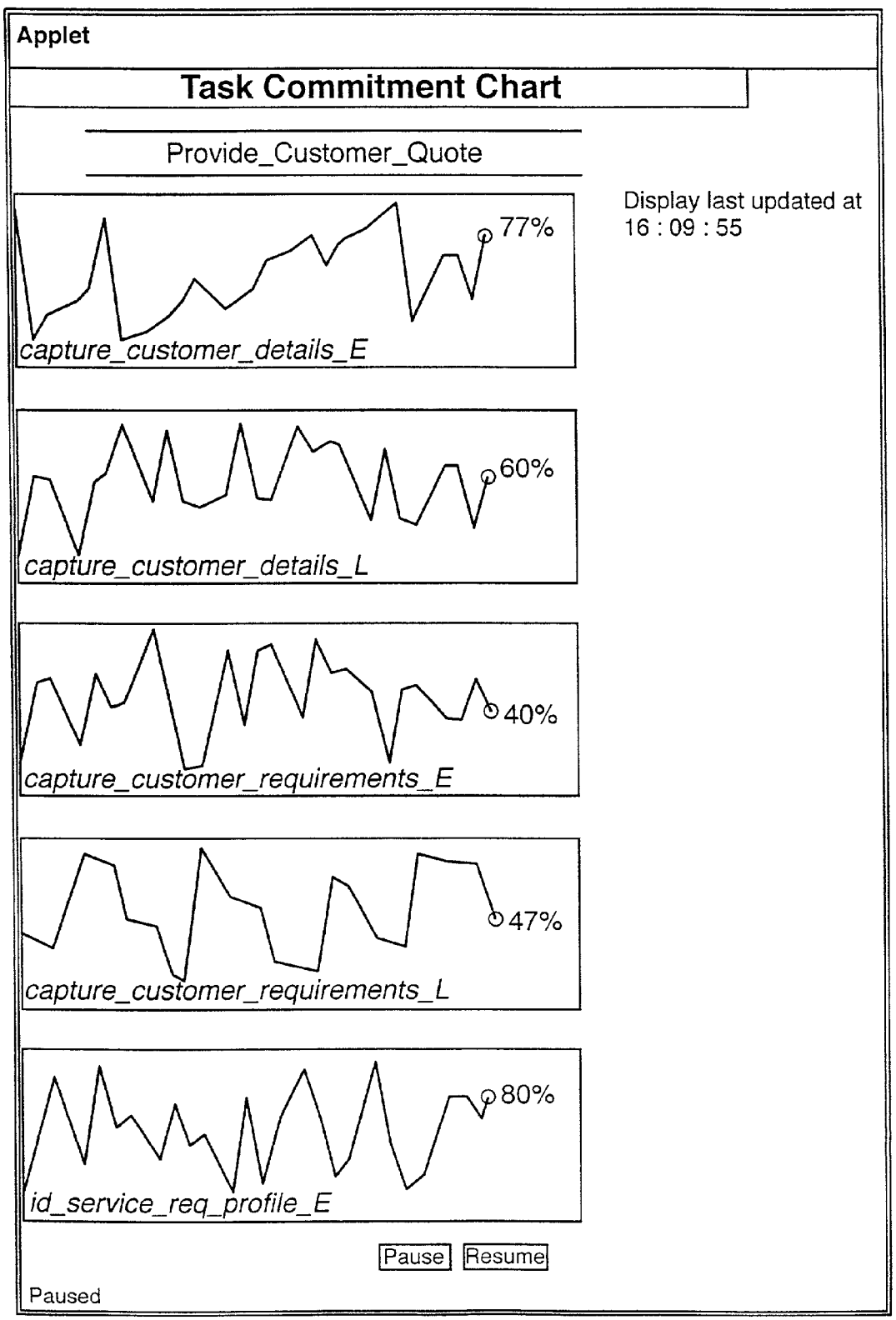

Referring to FIG. 20, a task commitment chart for the Provide_Customer_Quote service is shown. Each line represents a particular task type of the service. The number represents the percentage utilisation of that task type. When the chart is active, the numbers represent the task usage at a particular time interval. The Task Commitment Chart shows the task usage as part of a particular service over a period of time. From the presentation of information provided by this BME tool, a manager can see the historical trend of the task usage.

Figure 21:
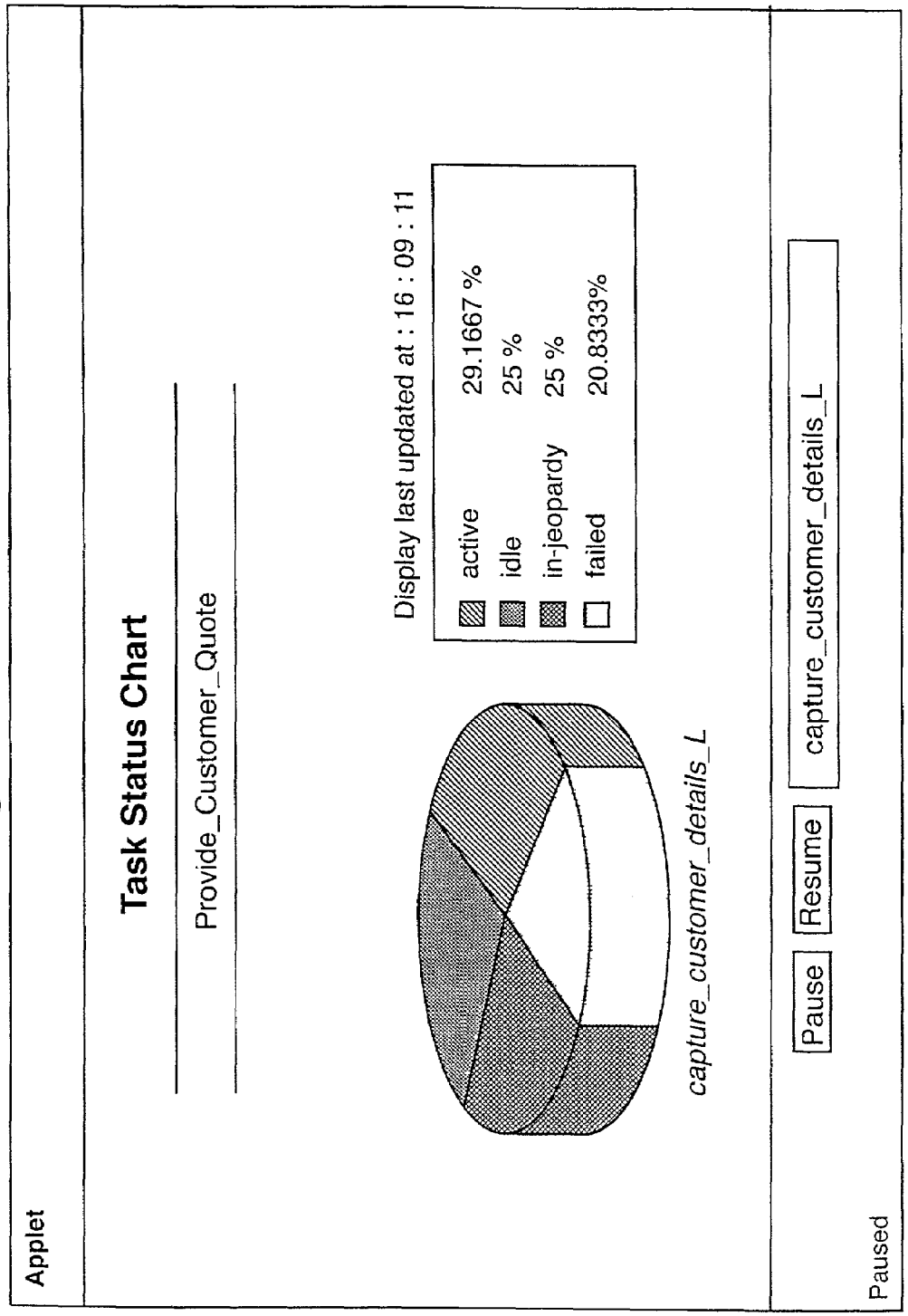

Referring to FIG. 21, a task status chart of the capture_customer_details_L task as part of the Provide_Customer_Quote service is shown. The Task Status Chart is a pie-chart showing the relative proportion of tasks (belonging to the same task-type within a particular service) that are in one of the following states: active, idle, in-jeopardy or failed.

Figure 22:
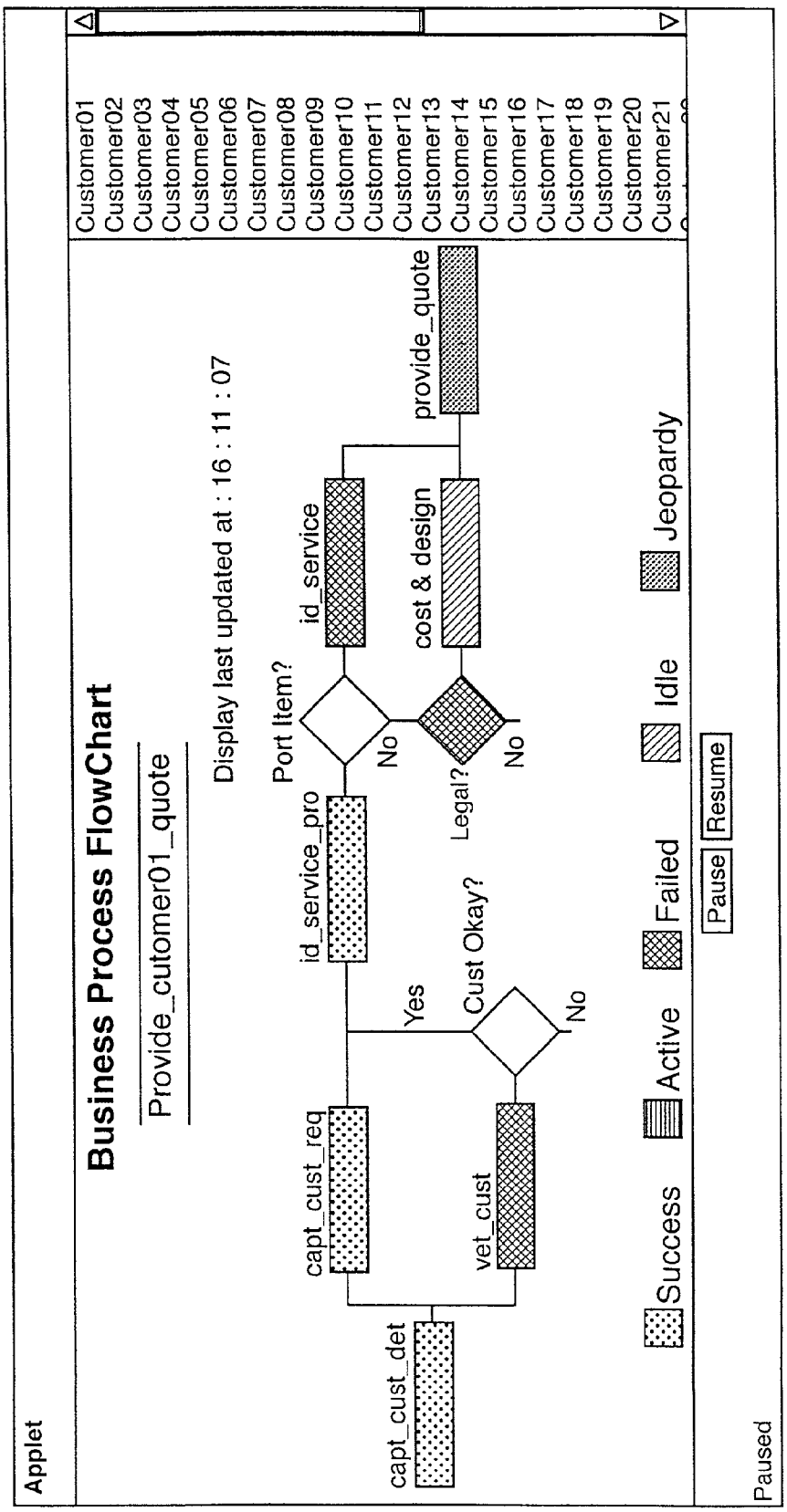

Referring to FIG. 22, the Business Process Flow Chart is a flow chart showing the progress of each individual customer's contract. The colour of each box represents the state of the task at that moment in time. It allows the user to visualise the status of an execution of the overall business process for an individual customer and to drill down to a sub-business process by clicking one of the boxes.

Figure 23:
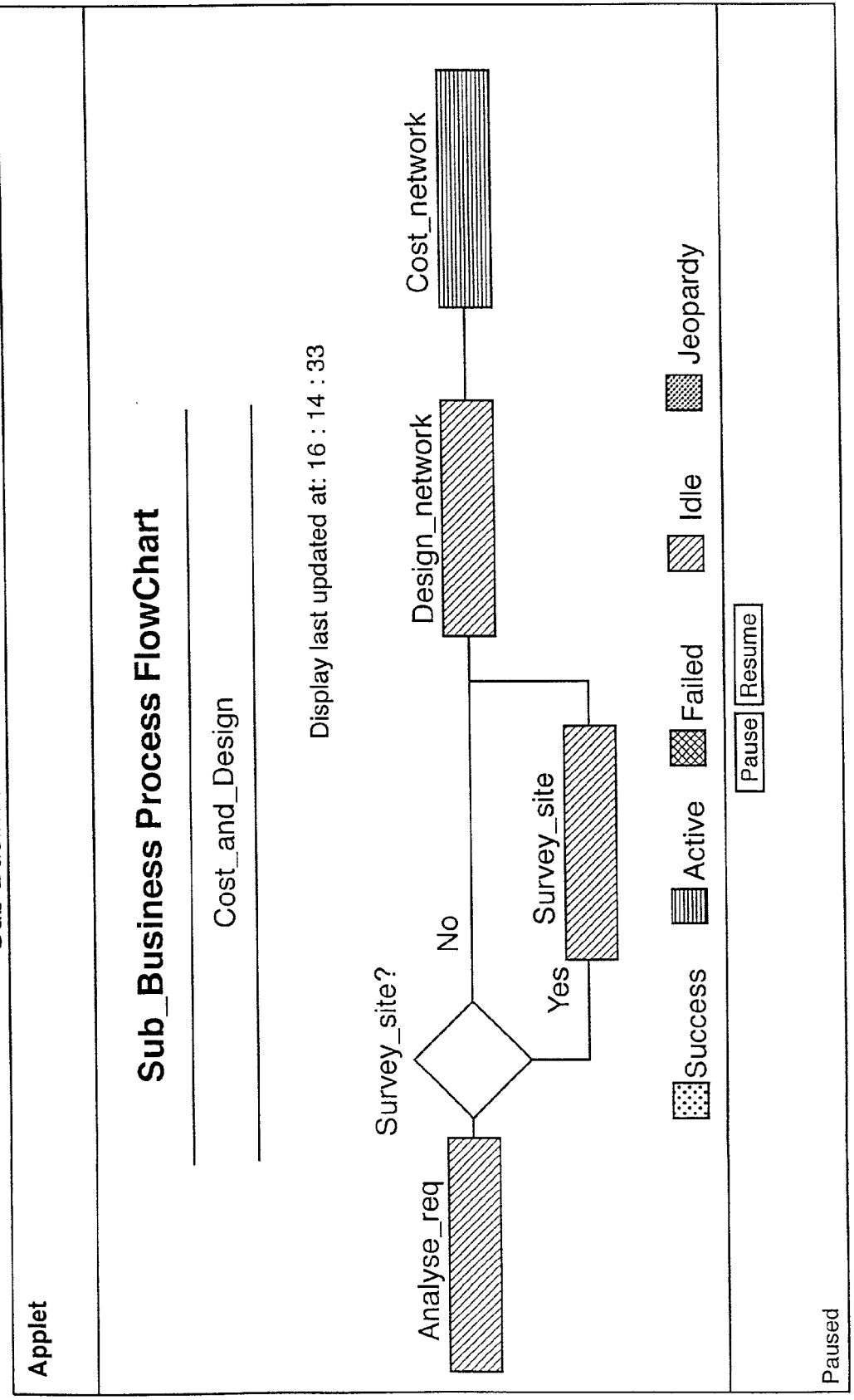

Referring to FIG. 23, sub business process views can be displayed by clicking each task box.

Figure 24:
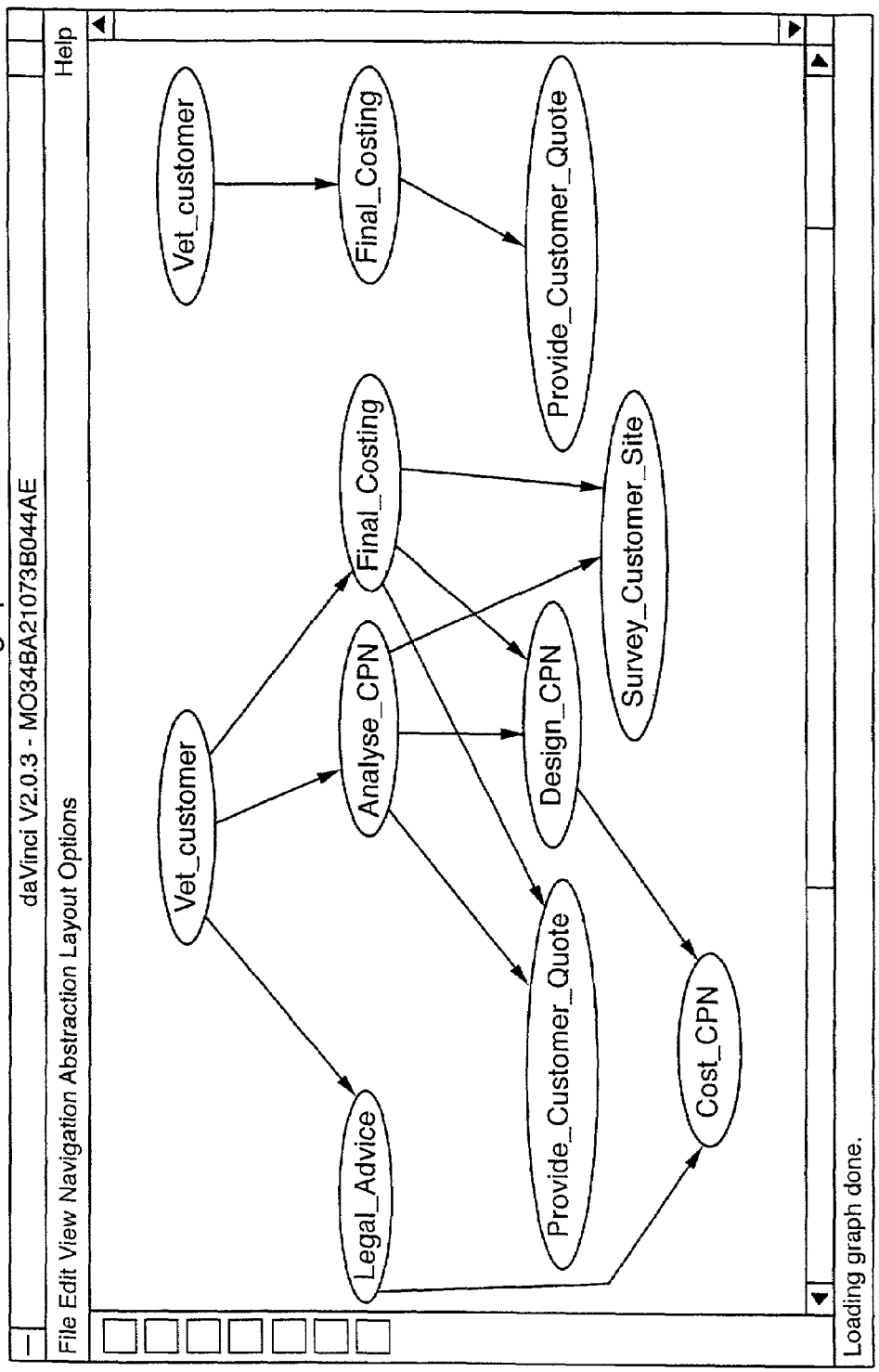

Referring to FIG. 24, an SLA execution graph shows the actual relationship between SLAs.

6. Implementation

This section gives some details of how the system is implemented.

AMS external interfaces to APMS agents are defined as a set of CORBA IDLs. These external interfaces are implemented using OrbixWeb from IONA Inc. MIA is implemented in JAVA, Pro*C, PL/SQL. VA and EA are implemented in JAVA, HTML and VRML. The packages used are JDBC, DaVinci. MIA also uses an Oracle database.

MIA is implemented in JAVA, Pro*C and PL/SQL. There are two ways to connect to Oracle databases from JAVA: JDBC and/or JAVA native methods. Through JDBC, all database query APIs are defined as JavaEQL class methods. These methods construct EQL queries from API parameters and then pass them to EQL parsers which are defined in JavaEQLParser class. EQL parsers return SQL statements. These SQL statements are passed to JavaDatabase class where these SQL statements are converted to JDBC queries to Oracle databases.

Through Java native methods, all database query APIs are defined as Java native methods. These Java native methods are implemented in C. There is one to one correspondence between API queries and C functions. Each API C function parses the query and then calls a Pro*C function to construct a PL/SQL query to access Oracle databases.

The service management module 310 manages all VA and EA requests. VA and EA requests are process by class ThreadManagement. It uses a vector to hold a current active request queue. Methods are defined to operate this queue such as inserting a new request, removing a request, and getting request details. Each request is represented by a request object which records details of the request.

DatabasePoller class defines methods which can feed data to VA at a given rate. In case of run-time visualisation, all data are forwarded to VA as soon as MIA receives them. If the visualisation is off-line, data are retrieved from databases and forwarded to VA at a particular rate.

6.1 EA implementation 6.1.1 Architecture

Referring to FIGS. 2 and 13, the EA architecture is composed of the core EA which realises the agent's services, an interface to the MIA 153 which breaks down high-level EQL queries into SQL queries which are performed using JDBC an interface to the VA 151 which prepares the EA's results for visualisation the concurrency workbench CWB as the data analyser 205 which provides process verification the graph drawing tool DaVinci (not shown separately)

6.1.2 Interface to the MIA 153 and Oracle database 155

The information necessary for the EA 152 is loaded to the Oracle database 155 by the MIA 153. In fact, much of the engineering agent's work is physically carried out by the MIA providing high-level information. In particular, the EA is provided with the following methods:

initMIA(user,password) connects to the database and returns a statement used as reference by all subsequent calls.

The following calls all return ResultSets:

getAgents(stmt) returns agent names getBadGuys(stmt) returns agent names of workers who did not carry out their SLAs getGoodGuys(stmt) returns all agent names of workers who did their SLAs getBusyBody(stmt) returns agent names, number of SLAs, average time per SLA, sum of times for SLAs, minimal and maximal time for SLAs, variance of times.

getInteragentcommunication(stmt) returns sender, receiver, and number of messages exchanged ordered by number of messages getInteragentcommunicationTrace(stmt) returns sender, receiver, message type of messages sent ordered by time getNumberMsgSent(stmt,name) returns number of messages sent by an agent getMsgSentTo(stmt,name) returns agents to which messages were sent getMsgTypeSent(stmt,name) returns the types of messages sent getNumberMsgRecvd(stmt,name) returns the number of messages received getMsgRecvdFrom(stmt,name) returns the agents from whom messages were received getMsgTypeRecvd(stmt,name) returns the message types received getNumberSLAs(stmt,name) returns the number of SLAs committed to getNumberSLAsDone(stmt,name) returns the number of SLAs carried out getSLAInfo(stmt,name) returns average time per SLA, sum of times for all SLAs, minimal and maximal time per SLA for a particular agent getWorkload(stmt,name) returns capacity, committed and actually carried out workload for a particular agent getInitialSLA(stmt) returns the SLAs which do not have predecessors wrt temporal order getGlobalSLAsucc(stmt,sla) returns the successors of an SLA wrt a temporal order and independent of a particular business process getSLAsucc(stmt,sla,bp_context) returns the successors of an SLA wrt a temporal order and a business process The interface realises the methods by according views on the database.

6.1.3 Engineering agent (Class EA)

Using the methods provided by the above interface, the engineering agent implements the following services:

getAgentOverview( ) returns an address of a web page with general information of the analysed multi-agent system get3Dtrace( ) returns an address of a VRML page containing a 3D animation of the multi-agent system's performance get2Dclustero returns an address of a HTML page loading an applet that animates the agents' closeness evolving over time getagent(name) returns an address of a web page with information on a particular's agent performance monitor SLAexecution( ) returns an address of a page containing a graph in DaVinci Format. The graph represents the temporal order of SLA execution per business process.

verifyProcesseso verifies all processes and returns its findings as an address of a web page.

getGlobalProcesso constructs a global process out of the local processes and translates the results to the DaVinci graph format which allows visualisation of the result.

6.1.4 Agency: agent overview (EA.getAgentOverview( ))

To give an overview over the multi-agent system, the agents are classified as good or bad workers depending on their carrying out all SLAs they committed to. Additionally, various statistical data on the SLAs is given, such as minimal and maximal time per SLA, average, sum and variance. To judge the closeness of two agents, the agent overview provides a table with the number of messages sent from one agent to another. This table allows identification of active and passive communicative agents.

6.1.5 Agency: 3D trace (EA.getTrace3D( ))

VRML is used to visualise the communication of a multi-agent system, the Virtual Reality Markup Language. VRML allows specification of three-dimensional worlds and animation of the worlds' objects. A three-dimensional visualisation is superior to a two-dimensional one if a large number of agents communicate. The VRML worlds allow the observer to navigate in the world and thus he or she can fly from one clique of agents to the next without losing the overview of the scenario.

VRML primitives are used to specify viewpoints, agent and message nodes and clocks. Basically, for each agent and each message a node is created. The agents are located on a circle with the message at the position of the sender. Initially, all message nodes are invisible. To animate the messages a path from the sender to the receiver of the message is specified. Additionally, for each message there is a clock. If a clock is activated, it emits events for one cycle and the message is made visible and traverses from the sender to the receiver during the clock's cycle. At the end of the cycle the message disappears again and the clock of the following message is triggered.

Positioning agents on a circle is only useful for a small number of agents. For large agent communities a general positioning algorithm has been developed. A technique called spring embedding is used on a distance table where distance could be inversely proportional to the number of messages exchanged between two agents or the number of interests shared by two agents, or the distance could actually mimic physical distance (which is an interesting option for mobile agents). The distances are seen as gravity forces and in an iteration an agent's "gravity field" is computed and the agent is moved a small step in the corresponding direction. After a number of iterations there is a fairly good approximation to the distances specified in the distance table.

6.1.6 Agency: clustering (EA.getCluster2D( ))

Given the trace of the agents' communication, the clustering places the agents initially at random positions. In temporal order, each communication between two agents links them with an edge labelled by their actual distance. For each following communication of these two agents the labelled (and thus their distance) is decreased. For every communication taking place between other agents, the label is increased. Given these distances, a directed force is computed for every communication for each node. The force is computed by assuming that nodes if not connected repel each other, whereas connected nodes attract each other to reach exactly the distance specified by their label. Once the direction is computed, the node is moved in that direction.

6.1.7 Agent: agent information (EA.getAgent(name))

For each agent there is page describing its individual performance. Based on the speech acts the agents send and receive they are classified as managers or workers. Besides the statistical data already presented in the overview page, the individual workload of the agent is analysed for all SLAs it carried out. This analysis is summarised in a recommendation either to increase/decrease workload, bid more balanced for SLAs, or simply continue.

6.1.8 Domain: monitor SLA execution (EA.monitorSLAexecutiono( ))

Given a business process, a specification defines a general order in which the agents involved may execute their SLAs. For a particular instance of the business process, it is possible to view the actual execution in a graph representation.

6.1.9 Domain: verify processes (EA.verifyProcesses)

Processes are specified in PIF, the process interchange format. Bad performance of an agent may be process inherent. That is, if the agents underlying business process is not properly designed, it misses its targets. Given the formal representation of an agent's business process, it is possible to verify various properties. CCS, the calculus for concurrent systems, is used to analyse and verify business process. Given the translation from PIF to CCS, as defined below, and the concurrency workbench, a verification tool for CCS, it is possible to detect for instance whether a process contains deadlocks or matches a more abstract specification.

To translate PIF into CCS, only three PIF constructs are needed: the decisions and activities, and the successor relation over the decisions and activities. The predecessor relation is obtained from the successor relation. Additionally, it is assumed that there is only one initial activity. The case of more than one initial activity can be reduced to the case of one by introducing a new initial activity whose successors are the previous initial activities.

Basically, the algorithm treats the process as a graph and traverses it depth-first beginning with the initial activity. In case a node is visited the first time and it has other predecessors an acknowledgement is sent for all predecessor except for the parent node visited in the previous step. Next, the node's action (activity or decision) is carried out and then for each branch leaving the node the algorithm is called recursively. Depending whether the node is an activity or a decision, the results are composed by summation or parallel composition. In the case that the node has already been visited, the acknowledgement sent in the first visit is received. The algorithm is called with the current and its parent node and the set of acknowledgements to be synchronised as arguments. For the initial node no parent is given which is abbreviated as no_parent.

Algorithm:
Input: A set of nodes, i.e. decisions and activies, the successor and predecessor relation succ and pred, and an initial node n.
Initialisation: Unmark all nodes, call (CCS,Ack)= PIF2CCS(n, no_parent,{ }), return CCS\Ack
PIF2CCS(n,parent,Ack) returns a CCS expression
if marked(n) then return ('ack_parent.0,Ack+{ack_parent})
else
mark n;
CCSAck="";
while there are nodes m in pred(n)\{parent} do
CCSAck=CCSAck+"ack_m."
CCSSucc="";
if succ(n)={ } then CCSSucc="0";
for all m in succ(n) do
(CCSSucc2,Ack)=PIF2CCS(m,Ack);
if n is activity then CCSSucc=CCSSucc+"|"+CCSSucc2
else CCSSucc=CCSSucc+"+"+CCSSucc2
od
return CCSAck.n.(CCSSucc)

6.1.10 Domain: construct global process (EA.getGlobalProcesso( ))

Only the local business processes of agents are given and it is necessary to construct the overall process when the agents collaborate. Given the PIF specification of the local processes, one can detect the interfaces between the agents and connect exit points in one process description to entry points in the appropriate process descriptions of other agents. The resulting process describes the overall behaviour of the agent system.

6.1.11 Interface between engineering agent and visualisation

Since all services of the engineering agent are delivered as web pages the interface to the visualisation is simply realised by passing the web addresses. In a user interface, different views can be bought given a username and password to access the database. If bought, the services are delivered as hyperlinks to web pages containing the corresponding results.

6.2 Filters and translators

Filters and translators are implemented in Proc*C and PL/SQL. They can also for instance be implemented in JAVA. Filters filter out irrelevant messages by inspecting current database table requirements. Translators extract contents of messages and transform them into Oracle types. Filters and translators are not generically applicable because different agent systems have their own contents languages and syntax. The following describes how they are implemented in Proc*C and PL/SQL.

Filters are simple Pro*C programs. They use a structure pointer to represent database table requirements. The structure has three fields: {agent system, message type, database table}. The filter program takes a message and determines which agent system the message is from. If the agent system appears in the structure, the message type is extracted. Otherwise, the message is discarded. Then it will decide whether the pair <agent system, message type> is related to any database table. If the message is related to a table, the filter program calls the translator program. Otherwise, it is discarded.

The translator program first determines whether the message is an inter-agent message or an intra-agent message. Then it is passed to either inter-agent message translators or to intra-agent translators according to which agent system the message comes from. Note that translators have to be written for each agent system.

In translator programs, each message type is processed by a translation function which extracts relevant fields of the message, then converts them to Oracle types, and finally constructs SQL statements.

What is claimed is:

1. A performance visualization system for use in storing and visualizing performance data representing the performance of multi-agent systems in managing processes, said performance visualization system comprising:

i) a request input for receiving a performance visualization service request in respect of a multi-agent system;

ii) a performance data input for receiving performance data inputs from the multi-agent system;

iii) a service definitions store for storing a set of data visualization service definitions each comprising a data visualization service identifier and one or more service requirements in relation, thereto said service requirements including identification of data inputs required for provision of said performance visualization services in respect of each data visualization service;

iv) performance visualization service request processing means for accessing a service identifier in a received performance visualization service request;

v) service identifier processing means for selecting a service definition from the service definition store in accordance with an accessed service identifier;

vi) a performance data input store for storing performance data inputs from the multi-agent system required for provision of the performance data visualization service associated with an accessed data visualization service identifier; and vii) means to associate data inputs received from a multi-agent system with the multi-agent system which generated the performance data, together with means to review the contents of the performance data input store for entries in respect of that multi-agent system.

2. A performance visualization system as in claim 1, the system also comprising a visualization tool store for storing a set of visualization tools.

3. A performance visualization system as in claim 1, wherein said service definitions store defines a data storage service in which data inputs of one or more types are stored in the data input store.

4. A performance visualization system as in claim 3 having means to map data inputs identified by a first service definition to data inputs already stored in accordance With a second service definition.

5. A performance visualization system as in claim 2, the system further comprising a visualization tool input for loading visualization tools to the visualization tool store, said store being provided with an index of tools currently loaded.

6. A performance visualization system as in claim 1 which system also comprises data analysis means.

7. A method of visualizing performance data representing the performance of systems in managing processes, said method comprising:

i) receiving a performance visualization service request in respect of multi-agent system;

ii) receiving performance data inputs from the multi-agent system;

iii) storing a set of performance data visualization service definitions in a service definition store, each said service definition including a data visualization service identifier and identification of data inputs required for provision of said data visualization service;

iv) accessing a performance data visualization service identifier in a received performance data visualization service request;

v) selecting a service definition from the service definition store in accordance with the accessed service identifier; and vi) storing data inputs in association with the multi-agent system making the performance visualization service request, which performance data inputs have been identified by the selected service definition.

8. A method as in claim 7, the method further comprising:

loading one or more service definitions to the service definitions store, subsequent to receiving performance data inputs from the multi-agent system, said subsequently loaded service definition(s) identifying at least one of said data inputs previously received.

* * * * *